United States Patent
Kubo et al.

(10) Patent No.: US 10,572,201 B2
(45) Date of Patent: Feb. 25, 2020

(54) INFORMATION PROCESSING APPARATUS AND NON-TRANSITORY COMPUTER READABLE MEDIUM FOR STREAMLINED DISPLAY OF IMAGE TO BE OUTPUT AND IMAGE LINKED WITH CONTENT

(71) Applicant: FUJI XEROX CO., LTD., Tokyo (JP)

(72) Inventors: Keisuke Kubo, Kanagawa (JP); Masahiko Fujita, Kanagawa (JP); Takeyasu Koyanagi, Kanagawa (JP); Yusuke Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/120,769

(22) Filed: Sep. 4, 2018

(65) Prior Publication Data

US 2019/0286396 A1 Sep. 19, 2019

(30) Foreign Application Priority Data

Mar. 16, 2018 (JP) .................. 2018-048720

(51) Int. Cl.
*G06F 3/12* (2006.01)
*G06F 3/0482* (2013.01)
*H04N 1/00* (2006.01)
*G06F 3/0484* (2013.01)

(52) U.S. Cl.
CPC .......... *G06F 3/1256* (2013.01); *G06F 3/0482* (2013.01); *G06F 3/04845* (2013.01); *G06F 3/04847* (2013.01); *G06F 3/1208* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 2009/0037605 | A1* | 2/2009 | Li | G06Q 20/12 709/246 |
| 2009/0193364 | A1* | 7/2009 | Jarrett | G06F 3/04817 715/838 |
| 2014/0033095 | A1* | 1/2014 | Koba | G06F 3/04817 715/765 |
| 2015/0012381 | A1* | 1/2015 | Lazaro | G06Q 30/0633 705/26.8 |
| 2015/0199125 | A1 | 7/2015 | Tsukamoto et al. | |
| 2015/0212762 | A1* | 7/2015 | Nakamura | G06F 3/1204 358/1.15 |

FOREIGN PATENT DOCUMENTS

| | | |
|---|---|---|
| JP | 2009-260599 A | 11/2009 |
| JP | 2015-132965 A | 7/2015 |

* cited by examiner

*Primary Examiner* — Thomas D Lee
(74) *Attorney, Agent, or Firm* — Oliff PLC

(57) ABSTRACT

An information processing apparatus includes a display controller that causes an image to be output to be displayed if an operating instruction of a user has been received at an image linked with each piece of outputtable content.

32 Claims, 35 Drawing Sheets

INFORMATION PROCESSING APPARATUS AND NON-TRANSITORY COMPUTER READABLE MEDIUM FOR STREAMLINED DISPLAY OF IMAGE TO BE OUTPUT AND IMAGE LINKED WITH CONTENT

CROSS-REFERENCE TO RELATED APPLICATIONS

This application is based on and claims priority under 35 USC 119 from Japanese Patent Application No, 2018-048720 filed Mar. 16, 2018.

BACKGROUND

Technical Field

The present invention relates to an information processing apparatus and a non-transitory computer readable medium.

SUMMARY

According to an aspect of the invention, there is provided an information processing apparatus. The information processing apparatus includes a display controller that causes an image to be output to be displayed if an operating instruction of a user has been received at an image linked with each piece of output table content.

BRIEF DESCRIPTION OF THE DRAWINGS

Exemplary embodiments of the present invention will be described in detail based on the following figures, wherein.

DETAILED DESCRIPTION

Figure 1:
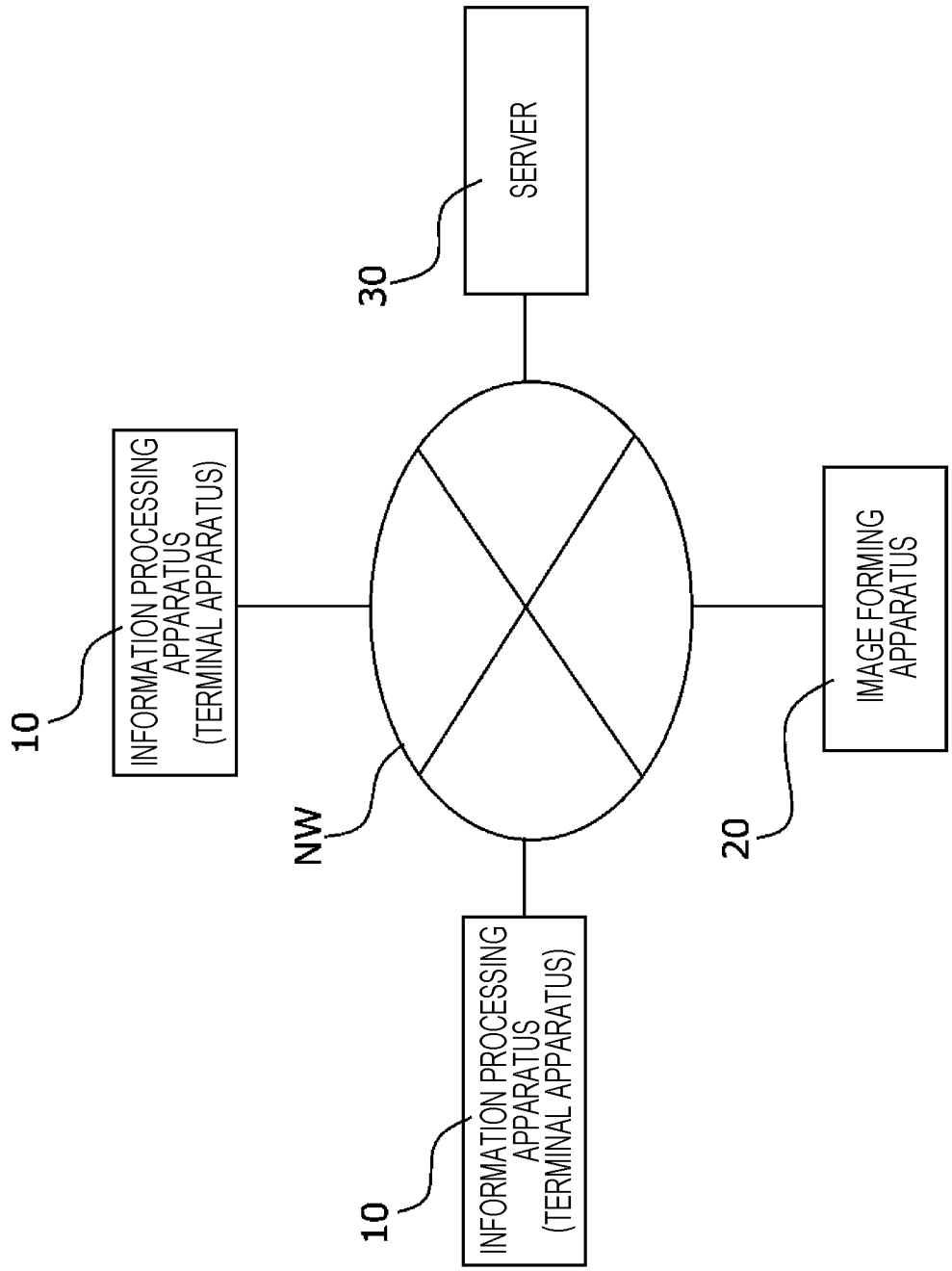
FIG. 1 is a block diagram illustrating an example of an information processing system of an exemplary embodiment.

Referring to the drawings, embodiments and modifications are described below. The present invention is not limited to the embodiments and the modifications. The drawings are schematic, and not necessarily drawn to scale. Elements other than those for helping understand the invention are appropriately omitted.

Figure 2:
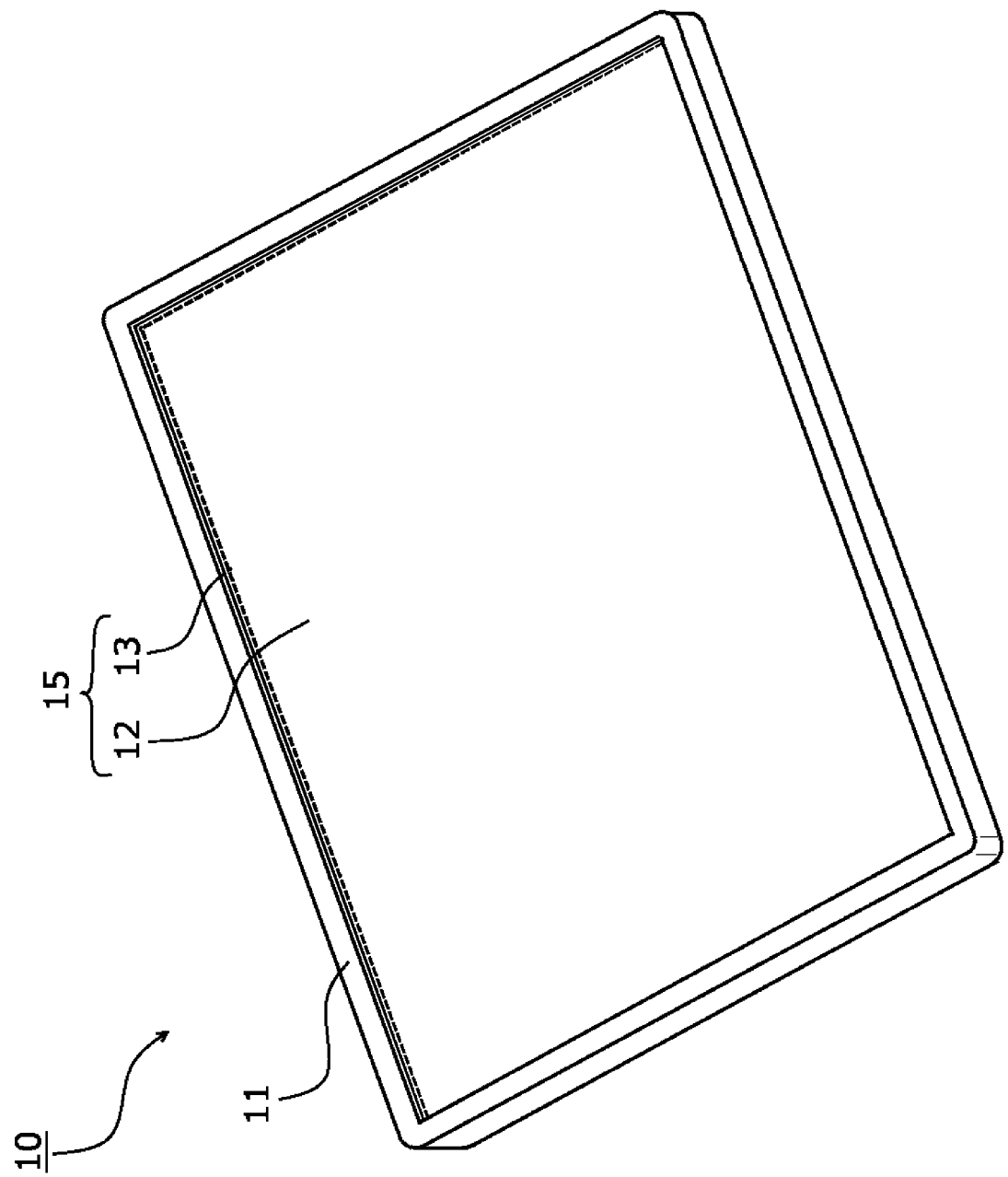
FIG. 2 is an external view of the information processing apparatus of the exemplary embodiment.
Figure 3:
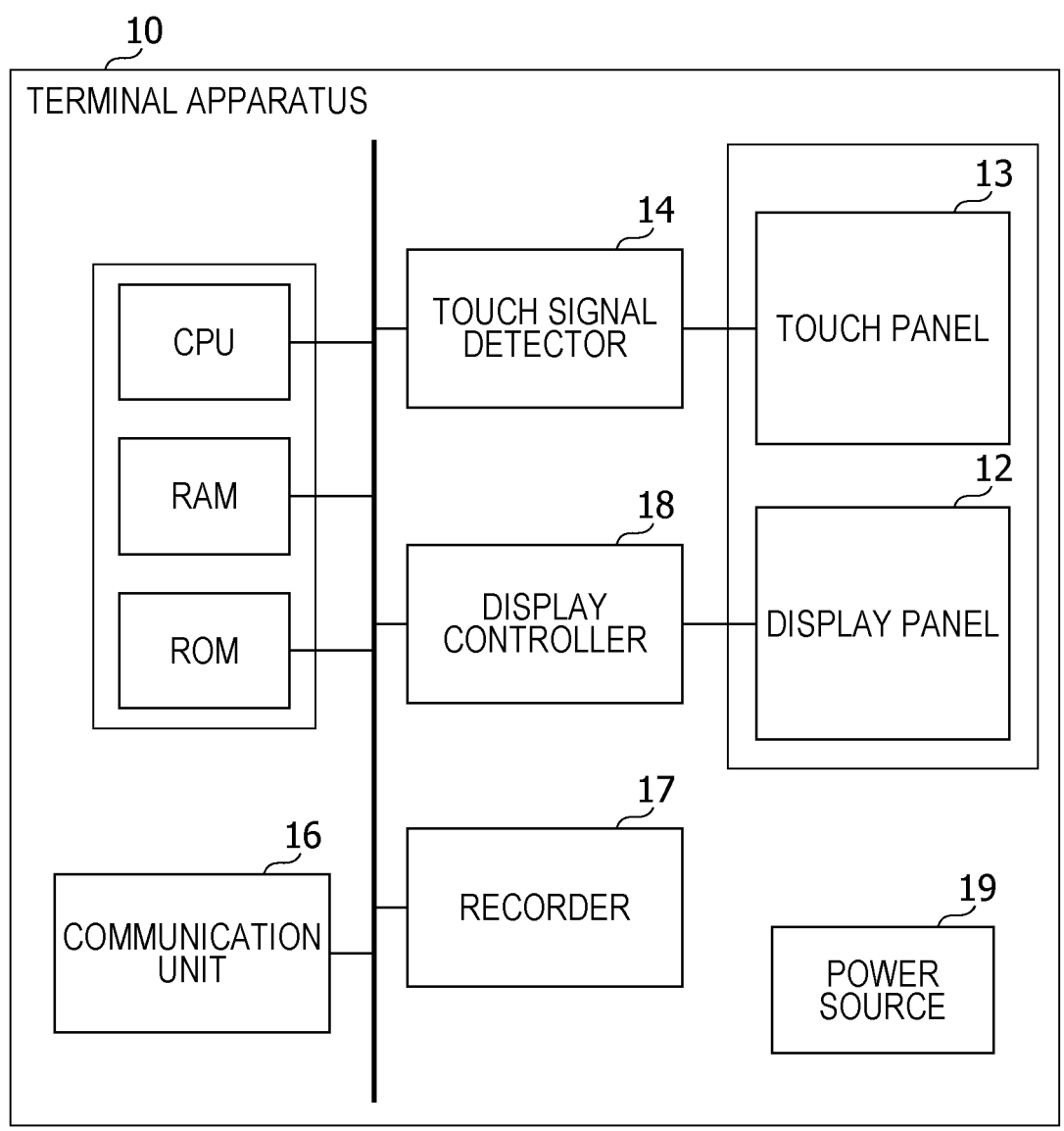
FIG. 3 is a functional block diagram illustrating the information processing apparatus of the exemplary embodiment.
Figure 4:
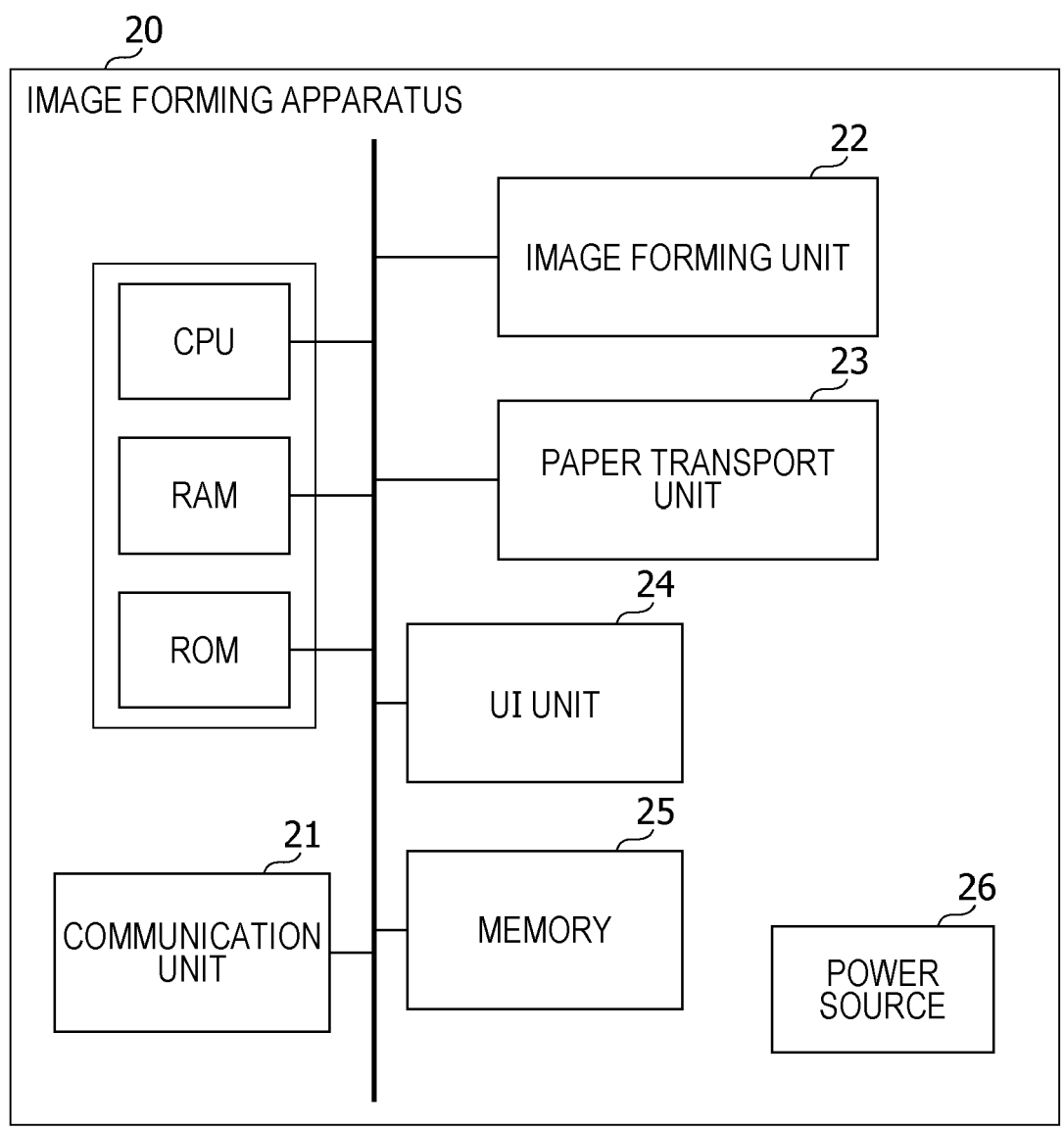
FIG. 4 is a functional block diagram illustrating an image forming apparatus of the exemplary embodiment.

FIG. 1 is a block diagram illustrating an example of an information processing system of an exemplary embodiment. FIG. 2 is an external view of the information processing apparatus of the exemplary embodiment. FIG. 3 is a functional block diagram illustrating the information processing apparatus of the exemplary embodiment, FIG. 4 is a functional block diagram illustrating an image forming apparatus of the exemplary embodiment. The information processing system includes a terminal apparatus 10 as an example of an information processing system, an image forming apparatus 20 as an example of a printer, and the server 30. The terminal apparatus 10, the image forming apparatus 20, and the server 30 are interconnected to each other via a network N. Referring to FIG. 1, two terminal apparatuses 10 are included in the information processing system. It is sufficient if one or more terminal apparatuses 10 are included in the information processing system. Alternatively, multiple servers 30 and multiple image forming apparatuses 20 may be included in the information processing system.

The terminal apparatus 10 may be a smart phone, a tablet terminal, a notebook computer, or a desktop personal computer, and has a functionality as a user interface (UI) that has a display screen on which a variety of information including characters and images is displayed. The terminal apparatus 10 of the exemplary embodiment includes a flat housing 11 as illustrated in FIG. 2. The terminal apparatus 10 includes a display input unit 15. The display input unit 15 includes a display panel 12 and a touch panel 13, both integrated into a unitary body. The display panel 12 serves as a display on one side of the flat housing 11 (on the front side of the flat housing 11 as illustrated in FIG. 2) and the touch panel 13 serves as an input unit. The flat housing 11 houses a display device and an electronic circuit board controlling the display device, and the like.

FIG. 2 illustrates the flat terminal apparatus 10 having a square shape in a plan view. The external shape of the flat housing 11, the shape of the display screen thereof and the screen size are not limited to any particular shape and size. The terminal apparatus 10 may be designed to be in a variety of shapes and sizes. For example, the size of the display screen may be as large as a sheet size A4 (297 mm×210 mm), for example.

Referring to FIG. 3, the terminal apparatus 10 includes the display panel 12 serving as a display, the touch panel 13 arranged on the display screen of the display panel 12, touch signal detector 14 that detects a touch signal obtained from the touch panel 13, a central processing unit (CPU) that functions as a controller, a random-access memory (RAM) serving as a volatile memory, a read-only memory (ROM) serving as a non-volatile memory, a communication unit 16, a recorder 17 serving as a non-volatile memory, a display controller 18 that controls updating of display content on the display panel 12, and a power source 19 that feeds power to each element of the terminal apparatus 10.

The touch panel 13 has a touch detection unit that detects on the display panel 12 a touch of a variety of objects, including a human hand, a human finger, a pen, or the like. The touch panel 13 is mounted such that information on a character or an image displayed on the display screen of the display panel 12 is visible. The touch panel 13 detects multiple coordinates input by a user's finger or pen, and generates a touch signal.

The touch signal detector 14 reads the touch signal from the touch panel 13 and outputs a signal indicating a touch position (touch point) on the touch panel 13. When the touch panel 13 is operated by the user's finger or pen, a detection signal generated in response to the operation is obtained. The signal is then transferred to the CPU, and the CPU detects the touch position in accordance with the received detection signal. The CPU interprets the operation by analyzing the movement or touch area of the touch point.

The CPU operates in accordance with a control program and control data stored on the ROM and the recorder 17, thereby integrally controlling the elements of the terminal apparatus 10. The CPU functions as an analyzing processor that analyzes the user's operation by analyzing the detection signal from the touch panel 13. The CPU thus implements a user interface. The CPU also executes display control. In other words, the CPU displays on the display panel 12 a software key image including a variety of icons and a scroll bar, and a window that is used to display an image and to enter characters.

The CPU performs operation detection control. More specifically, the CPU operates an icon via the touch panel 13, receives an entry of a character string on an input box of the window, or receives a scroll request of the display image via a scroll bar. The CPU further performs the operation detection control by interpreting the operation performed on the touch panel 13, and thus performs an input process responsive to an input operation, a mode switching operation, and a software key display control operation.

The communication unit 16 is an interface with an external device (the image forming apparatus 20 or the server 30 in the exemplary embodiment) connected to the terminal apparatus 10, and is designed to be directly or indirectly connected to the external device via communications or network. Image data (content) and other data acquired from the external device via the communication unit 16 may be stored on the recorder 17. Information input via the touch panel 13 may be recorded on the recorder 17. The data stored on the recorder 17 may be displayed on the display panel 12, or may be output to the outside via the communication unit 16.

FIG. 4 illustrates the functional configuration of the image forming apparatus 20. The communication unit 21 is an interface, and has a functionality to transmit data to and receive data from another device. The communication unit 21 may be a communication interface having a radio communication functionality or a communication interface having a wired communication functionality.

The image forming unit 22 has a functionality to form an image. More specifically, the image forming unit 22 may implement at least one of a scanning functionality, a print functionality, a copy functionality, and a facsimile functionality. If the print functionality is implemented, an image is printed on a recording medium, such as a paper sheet.

The paper transport unit 23 includes multiple paper trays that hold paper sheets of different sheet sizes. A paper sheet selected from one paper sheet tray is supplied to the image forming unit 22. A user interface (UI) unit 24 includes a combination of a liquid-crystal display panel, variety of operation buttons, and a touch panel. The user of the image forming apparatus 20 enters a variety of settings, and instructions using the UI unit 24. A variety of information is displayed to the user of the image forming apparatus 20 via the liquid-crystal display panel.

The memory 25 is a non-volatile rewritable storage, such as a hard disk drive (HOD) or a flash memory. For example, the memory 25 stores information indicating an instruction for image forming (such as job information), image data that is to be printed, scan data that is generated as a result of performing a scanning operation, device address information indicating an address of another device, server address information indicating an address of the server 30, a variety of control data, a variety of programs, and the like. The CPU executes a variety of programs stored on a program storage region of the memory 25.

The server 30 stores shared files, such as an image to be processed by the terminal apparatus 10, and application programs. The terminal apparatus 10 downloads the shared file from the server 30 via the communication unit 16, and stores the shared file onto the recorder 17, or transitions the shared file into a state that enables the share file to be browsed.

Figure 5:
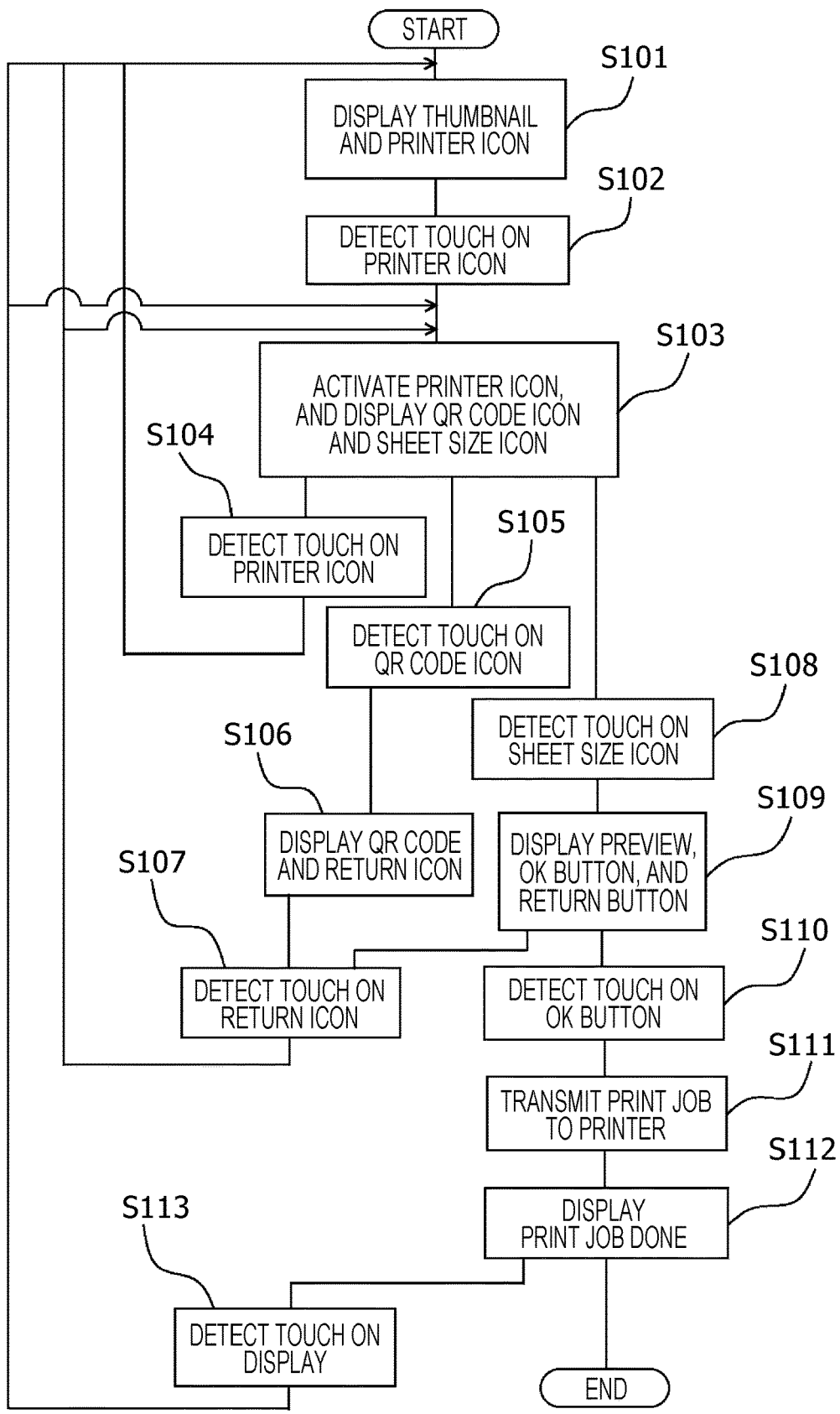
FIG. 5 is a flowchart illustrating a process of a user interface of a terminal apparatus serving as the information processing apparatus.

FIG. 5 is a flowchart illustrating a process of the user interface of the terminal apparatus 10 serving as the information processing apparatus. Display control performed by the terminal apparatus 10 as the user interface is described below. By receiving an operating instruction of a user, the terminal apparatus 10 performs the display control on an image that is linked with each piece of outputtable content stored in the share file of the server 30.

The terminal apparatus 10 displays thumbnails SN and printer icons PIC on the display panel 12 (S101). The thumbnail SN is an image that is downloaded from the shared file on the server 30 and is linked with an image file (content) recorded on the recorder 17. The printer icon PIC is an example of image to be output.

Figure 6A:
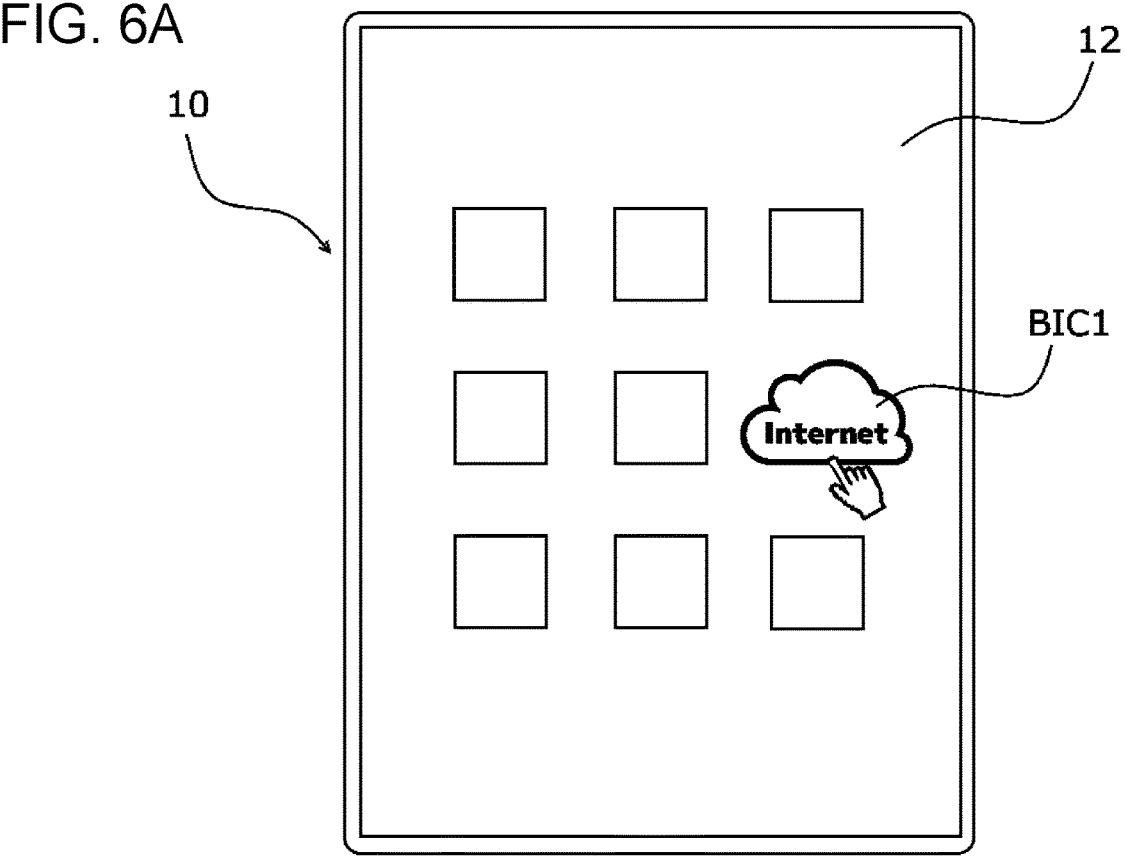
FIG. 6A illustrates an example of a screen displayed on the terminal apparatus after power-on, and FIG. 6B illustrates a log-in page of a browser displayed on the terminal apparatus.
Figure 6B:
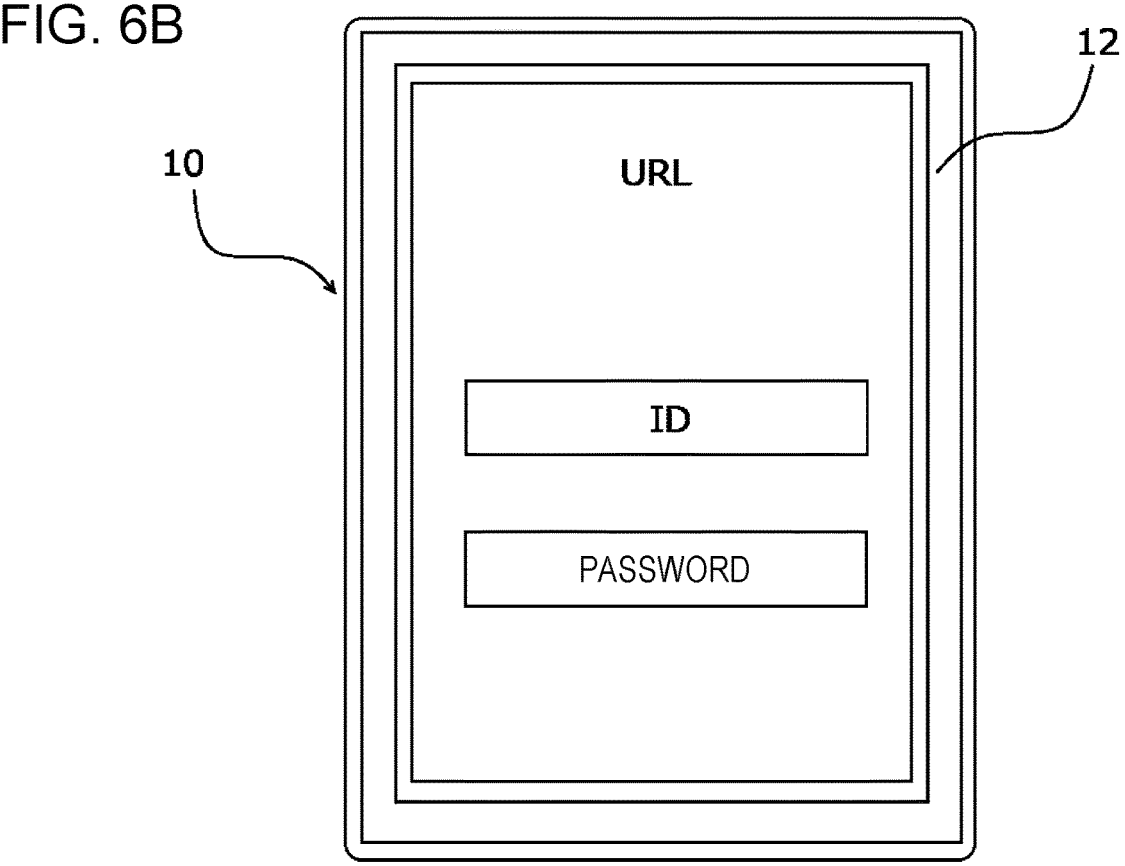
Figure 7:
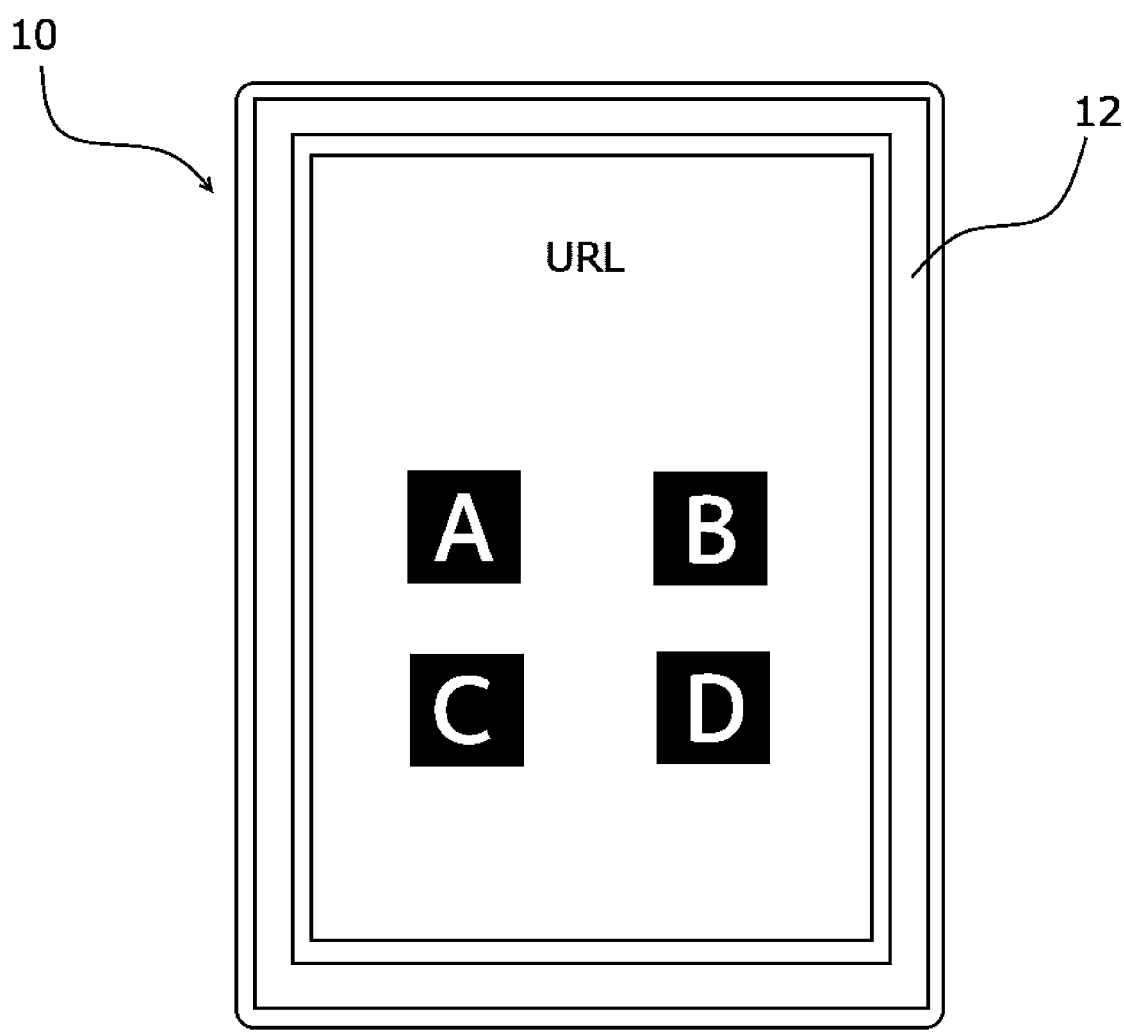
FIG. 7 illustrates an application selection screen displayed on the terminal apparatus.
Figure 8:
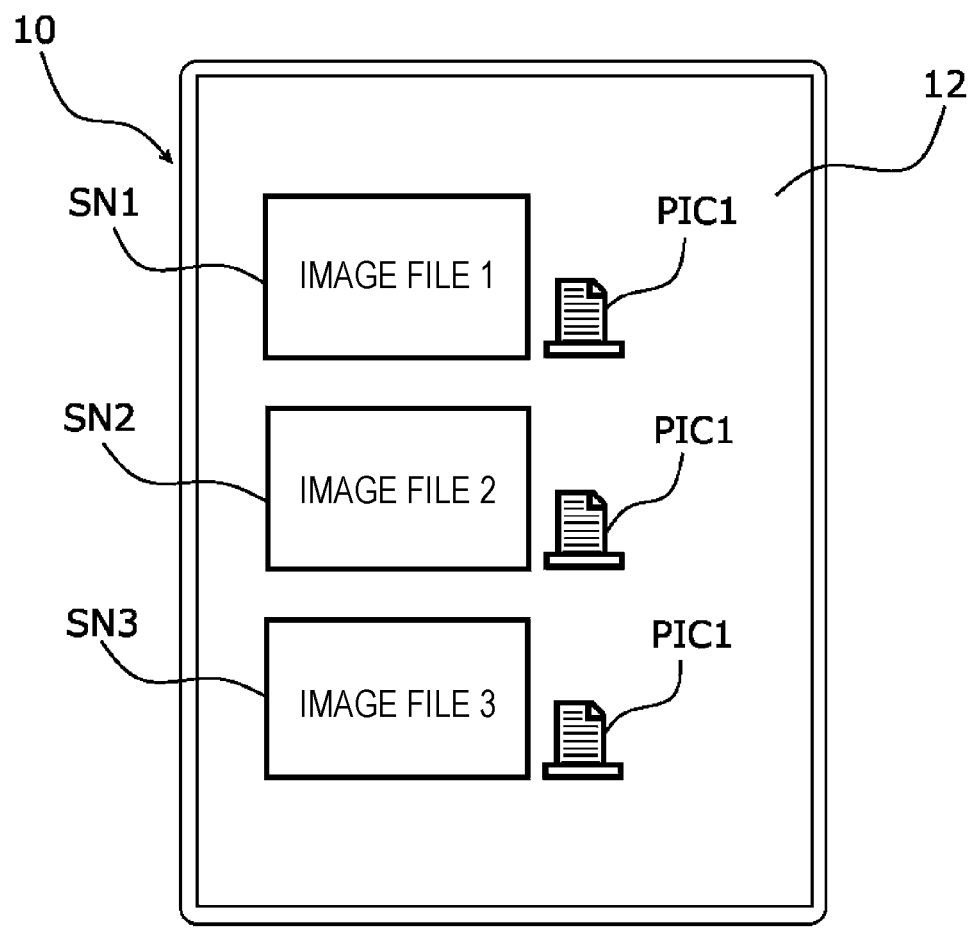
FIG. 8 illustrates thumbnails and printer icons displayed on the terminal apparatus.

FIG. 6A illustrates an image of a screen displayed on the terminal apparatus 10 after power-on. FIG. 6B illustrates a login page of a browser displayed on the terminal apparatus 10, FIG. 7 illustrates an application selection screen displayed on the terminal apparatus 10. FIG. 8 illustrates thumbnails and printer icons displayed on the terminal apparatus 10. In the terminal apparatus 10, touch on a web browser icon BIC 1 (see FIG. 6A) starts up a browser, and the browser accesses the server 30 when a predetermined uniform resource locator (URL) is entered into the browser. The server 30 transmits the login page to the browser of the terminal apparatus 10 (see FIG. 6E). When the terminal apparatus 10 receives an ID and a password of the user, the server 30 authenticates the user. The terminal apparatus 10 transitions to an application selection screen that displays multiple applications of FIG. 7 (four applications in FIG. 7).

Referring to FIG. 8, the program displays one or more image files as thumbnails SN 1, SN 2, and SN 3 in a line and printer icons PIC 1 close to displayed image files (image files 1, 2, and 3 in the exemplary embodiment). In this way, pieces of the content are linked with the printer icons.

Figure 9:
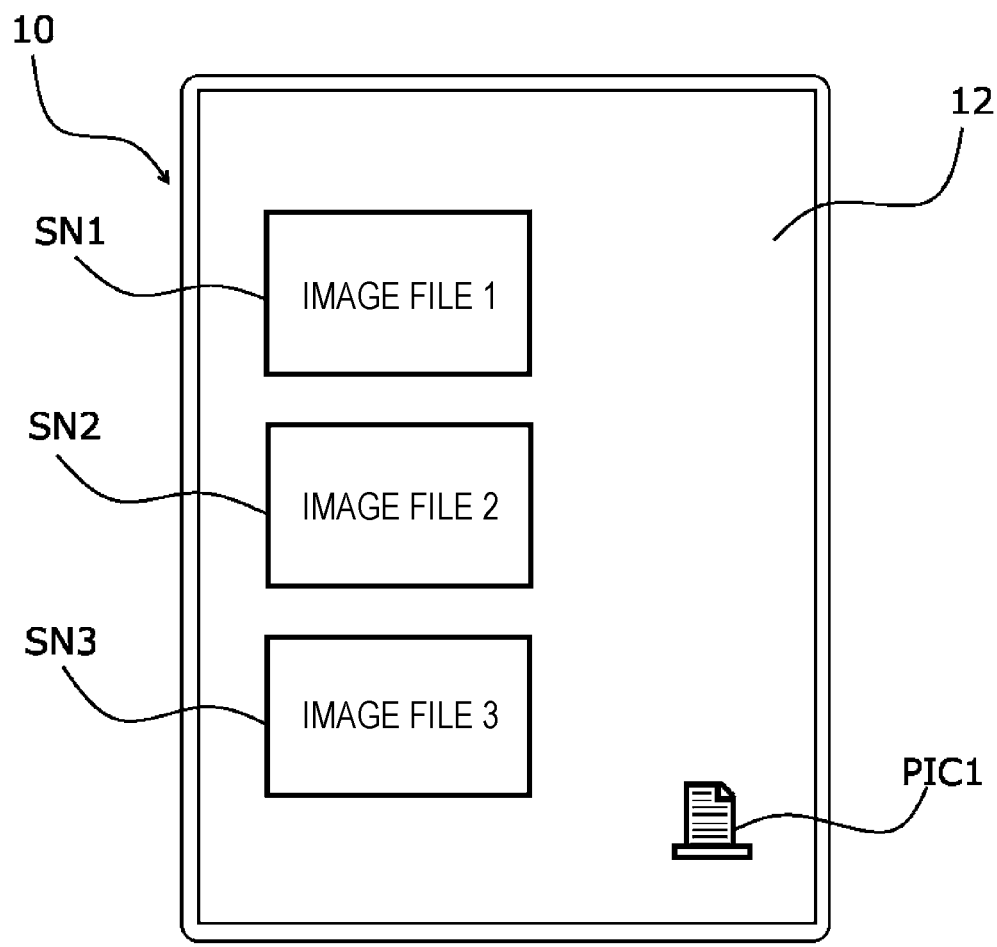
FIG. 9 illustrates thumbnails and a printer icon displayed on the terminal apparatus of a first modification.

FIG. 9 illustrates thumbnails and a printer icon displayed on the terminal apparatus 10 of a first modification. The program displays one or more image as thumbnails SN in a line, and also displays the printer icon PIC 1 on a display region in a manner such that the printer icon PIC 1 does not overlap another object image. The printer icon PIC 1 is thus displayed on the display screen of the terminal apparatus 10.

Figure 10:
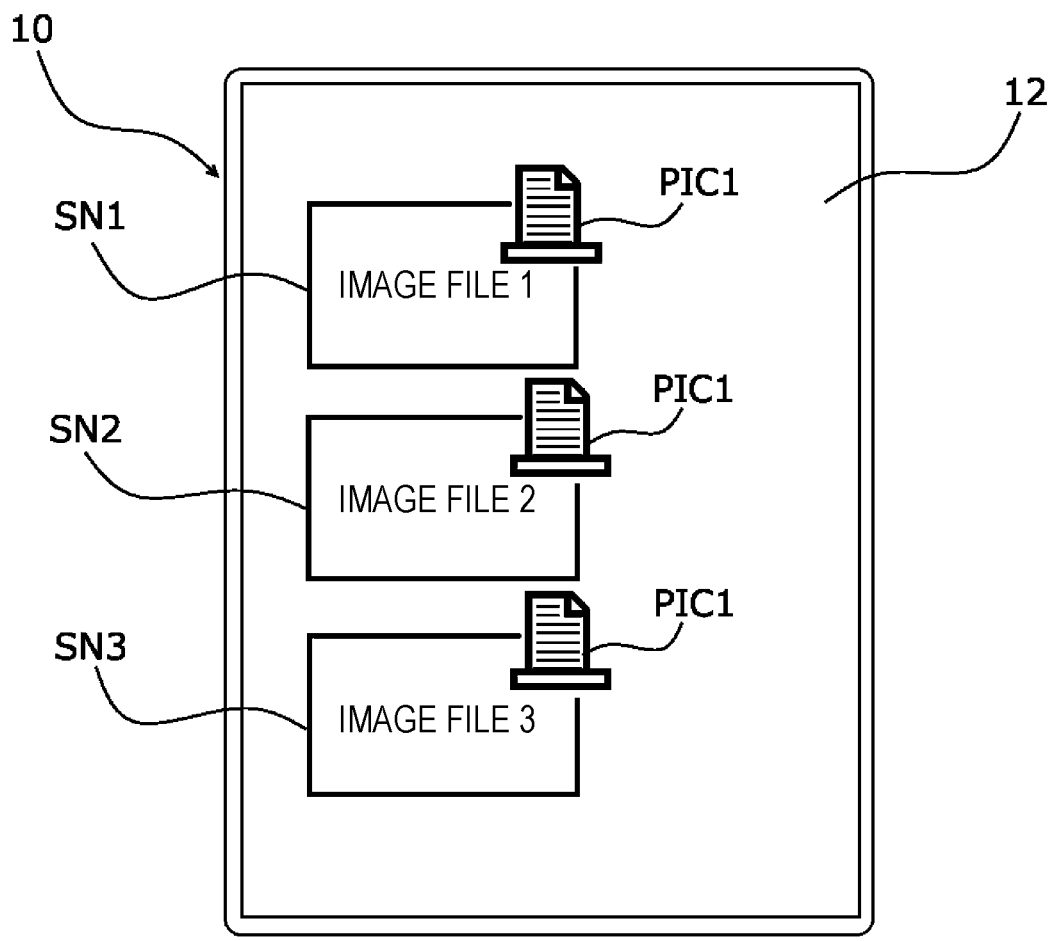
FIG. 10 illustrates thumbnails and printer icons displayed on the terminal apparatus of a second modification.

FIG. 10 illustrates thumbnails and printer icons displayed on the terminal apparatus 10 of a second modification. The program displays one or more image files as thumbnails SN in a line, and also displays the printer icons PIC 1 respectively overlappingly on the thumbnails SN. In this way, the pieces of the contents are more precisely linked with the printer icons.

Figure 11:
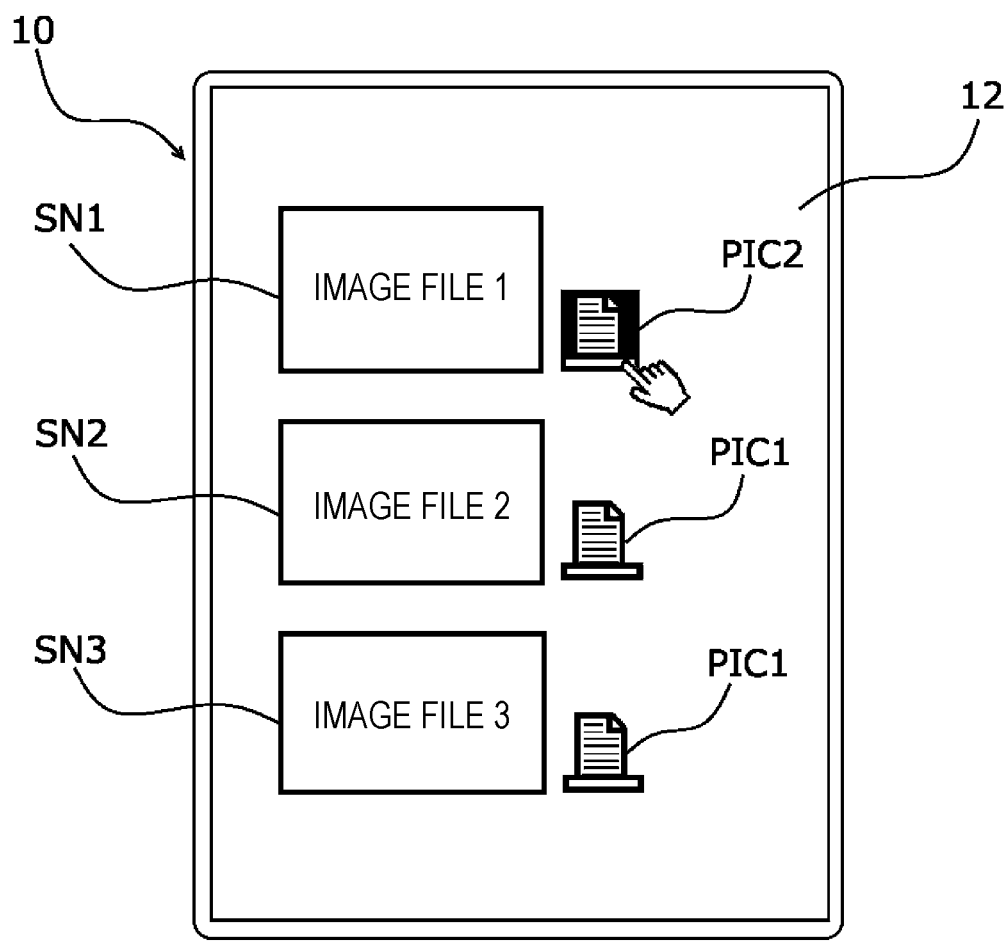
FIG. 11 illustrates thumbnails and printer icons displayed on the terminal apparatus wherein one printer icon has transitioned to an active state.

FIG. 11 illustrates thumbnails and printer icons displayed on the terminal apparatus 10. One printer icons is in an active state. The program detects one touch on the printer icon PIC 1 performed by the user (S102), and switches the printer icon PIC 1 to a printer icon PIC 2 that is in an active state as illustrated in FIG. 11. Note that if the program detects a touch on multiple printer icons PIC 1 by the user, the program switches from the printer icons PIC 1 that are touched to the printer icon PIC 2 that are in the active state.

Figure 12:
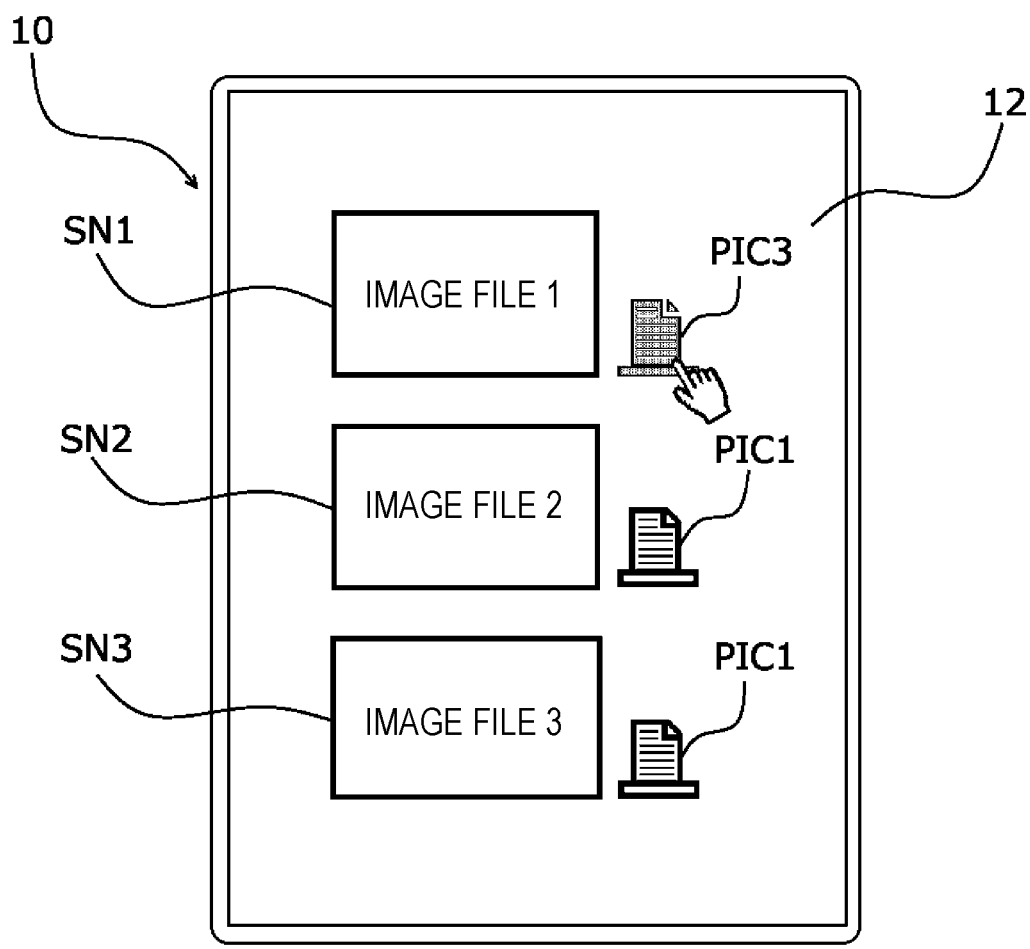
FIG. 12 illustrates thumbnails and printer icons displayed on the terminal apparatus, wherein a printer icon has transitioned to an inactive state.

FIG. 12 illustrates thumbnails and printer icons displayed on the terminal apparatus 10. One printer icon is set to be in an inactive state by a touching operation. Referring to FIG. 12, if the program detects the touching operation that the user has performed on the printer icon PIC 2 in the active state in the display form, the printer icon PIC 2 is transitioned to a printer icon PIC 3 that is in an inactive state that does not accept the touching operation of the user. If a touching operation on the printer icon PIC 3 in the inactive state is detected, the printer icon PIC 3 is transitioned back to the printer icon PIC 2 in the active state as illustrated in FIG. 11. In this way, the immediately preceding operation may be cancelled by minimum operation steps.

Figure 13:
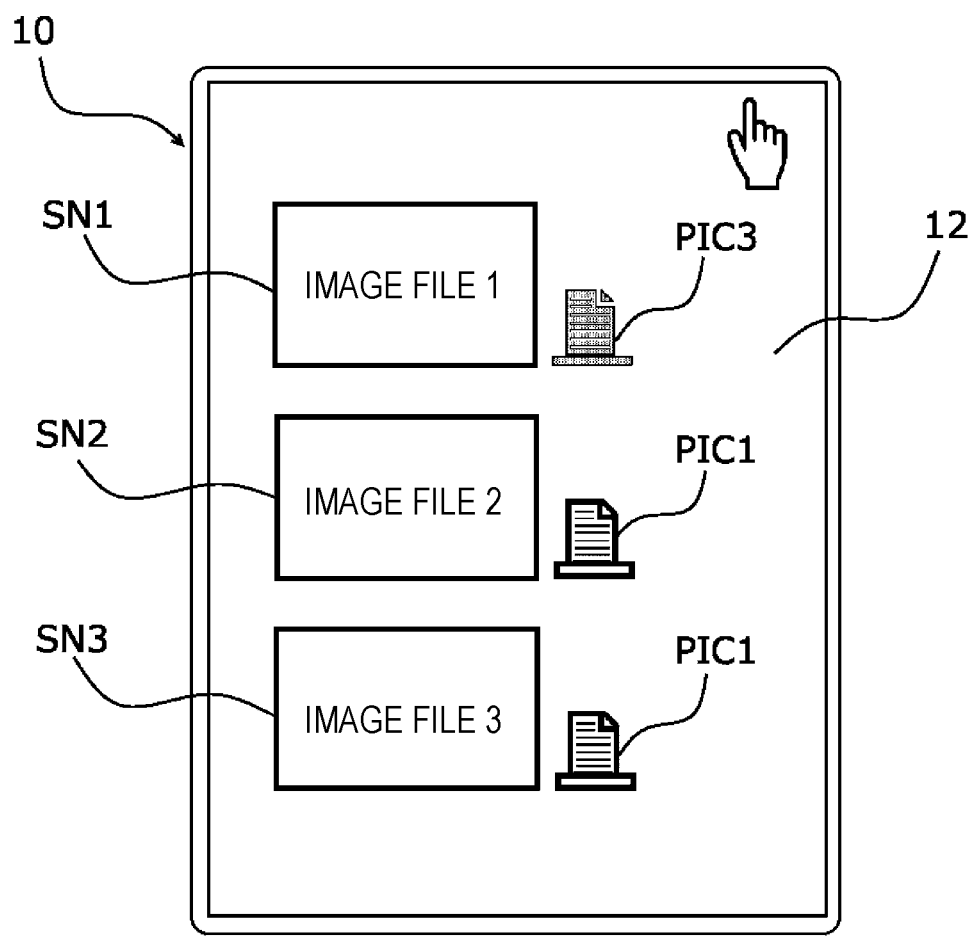
FIG. 13 illustrates thumbnails and printer icons displayed on the terminal apparatus of a third modification wherein a printer icon has transitioned to an inactive state in response to a touching operation performed near the printer icon.

FIG. 13 illustrates thumbnails and printer icons displayed on the terminal apparatus 10 of a third modification. One printer icon is transitioned to the inactive state in response to the touching operation performed the vicinity the printer icon. In the third modification, when the program detects the touching operation performed by the user on a predetermined region close to the display region of the printer icon PIC 2 in the active state as illustrated in FIG. 13, the printer icon PIC 2 transitions to the printer icon PIC 3 in the inactive state that does not accept the touching operation of the user.

Figure 14:
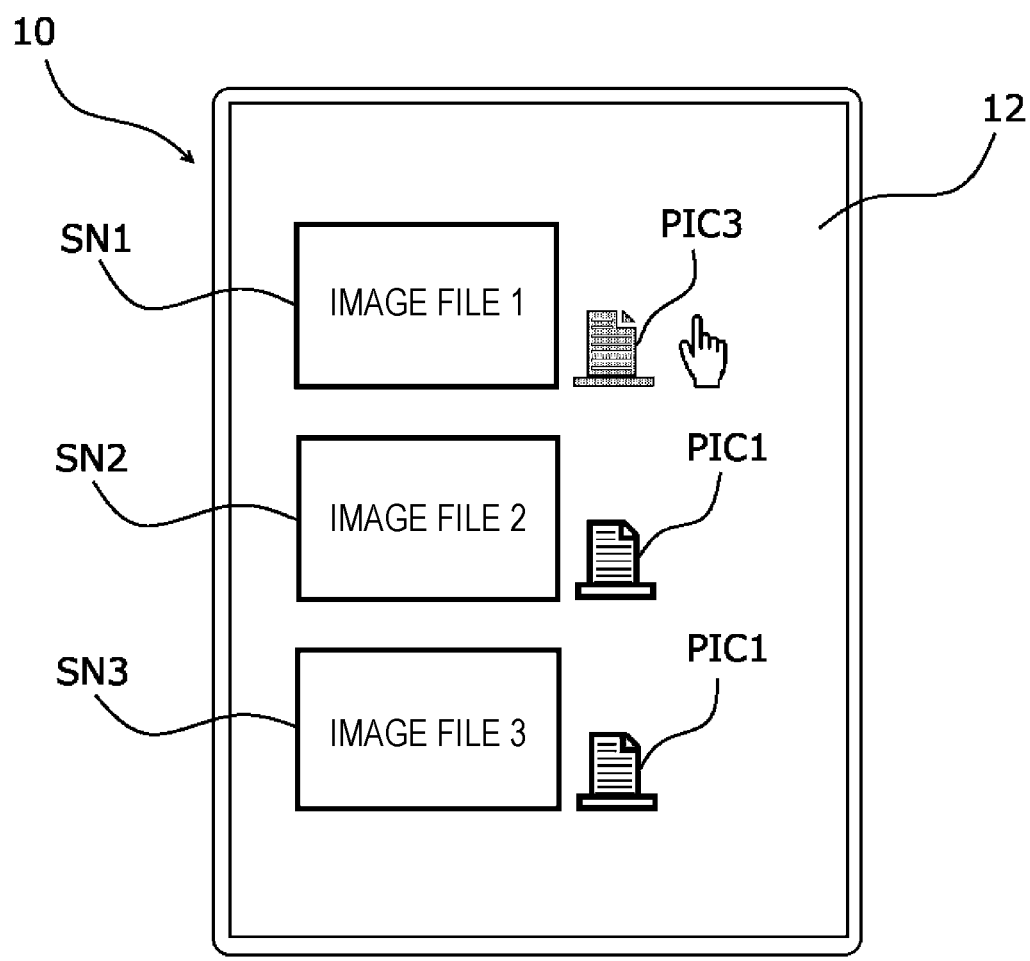
FIG. 14 illustrates thumbnails and printer icons displayed on the terminal apparatus of a fourth modification wherein a printer icon has transitioned to an inactive state in response to a touching operation performed on a blank area of a display screen.

FIG. 14 illustrates thumbnails and printer icons displayed on the terminal apparatus 10 of a fourth modification. One printer icon transitions to the inactive state in response to the touching operation performed on a blank area of the display screen. If the program of the fourth modification detects a touching operation of the user on the display screen where the thumbnails SN and the printer icons PIC are not displayed, the program transitions the printer icon PIC 2 to the printer icon PIC 3 in the inactive state that does not accept the touching operation of the user. In this way, the immediately preceding operation may be canceled by minimum operation steps.

Figure 15:
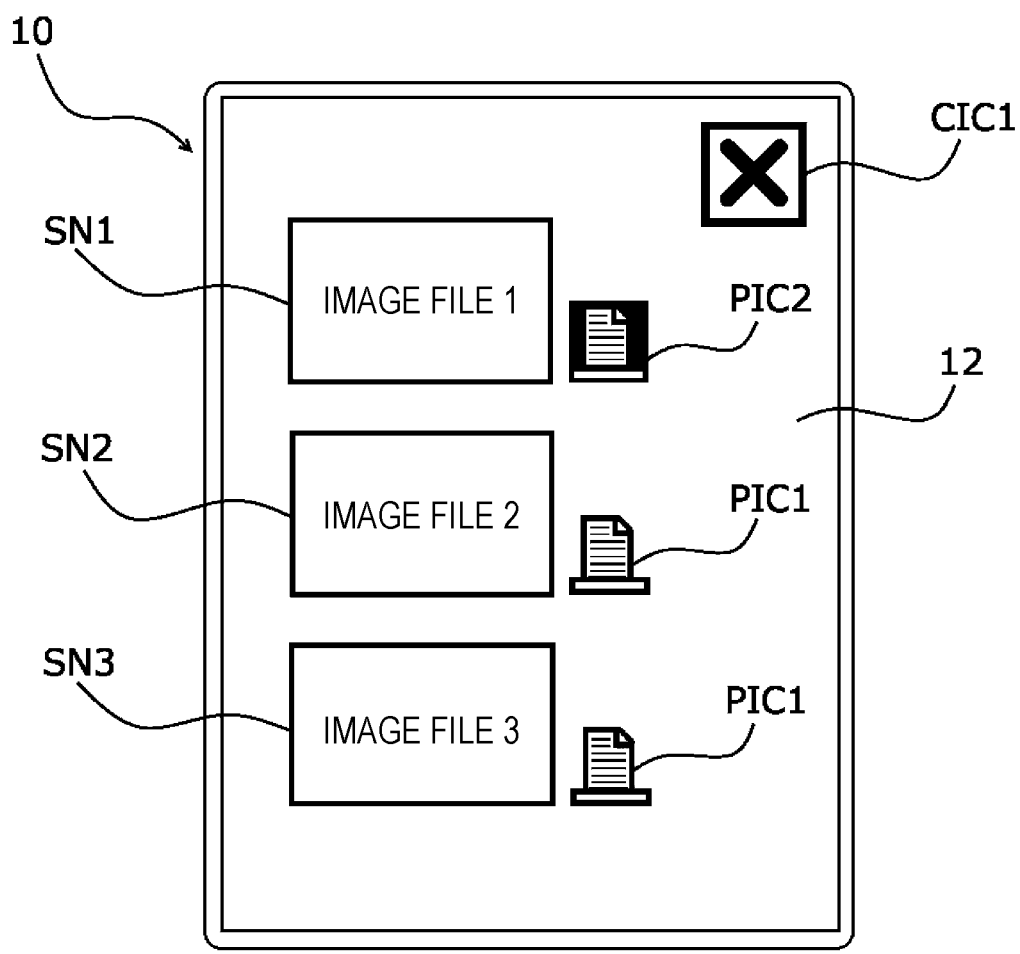
FIG. 15 illustrates thumbnails and a cancel button displayed on the terminal apparatus of a fifth modification wherein the cancel button is displayed in response to a touching operation performed on the blank region of the display screen.

FIG. 15 illustrates thumbnails and a cancel button displayed on the terminal apparatus 10 of a fifth modification. The cancel button is displayed in response to a touching operation performed on a blank region of the display screen. If the program of the fifth modification detects a touching operation of the user on the display screen where the thumbnails SN and the printer icons PIC are not displayed, the program displays a cancel button CIC 1 that serves as an operation receiving image that transitions the printer icon PIC 2 to the printer icon PIC 3 in the inactive state that does not accept the touching operation of the user. In this way, the cancelling method to cancel the immediately preceding operation is clearly displayed.

Figure 16:
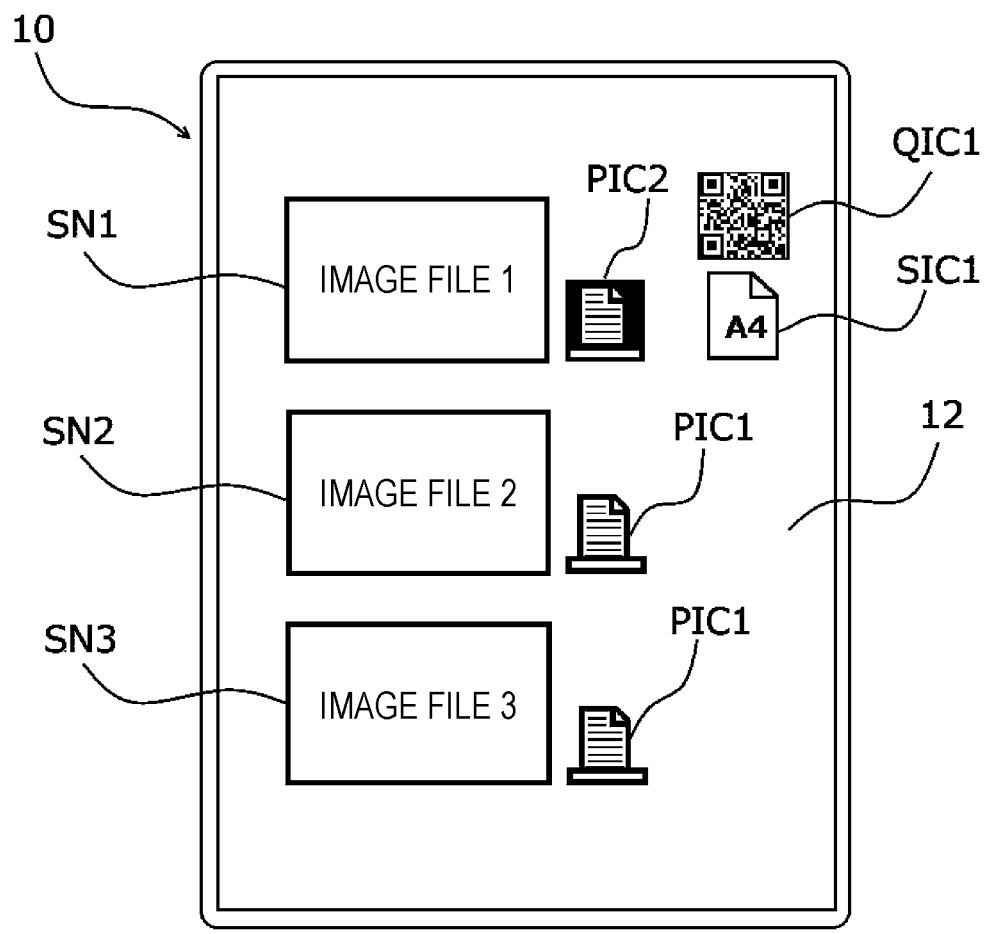
FIG. 16 illustrates thumbnails, printer icons, a code image, and a sheet size icon displayed on the terminal apparatus.

FIG. 16 illustrates thumbnails, printer icons, a code image, and a sheet size icon displayed on the terminal apparatus 10 of a fifth modification. The program transitions from the printer icon PCI 1 to the printer icon PIC 2 in the active state, and displays a QR code (registered trademark) icon QIC 1 as an example of a code image and a sheet size icon SIC 1 as an example of an output size image, close to the active printer icon PIC 2 as illustrated in FIG. 16 (S103). In this way, a next operation step to accuse and output the content is displayed. The code image is not limited to the QR code (registered trademark) as a two-dimensional code, but may be another two-dimensional code or a one-dimensional code, such as a bar code. The code image may also be a three-dimensional code.

Figure 17:
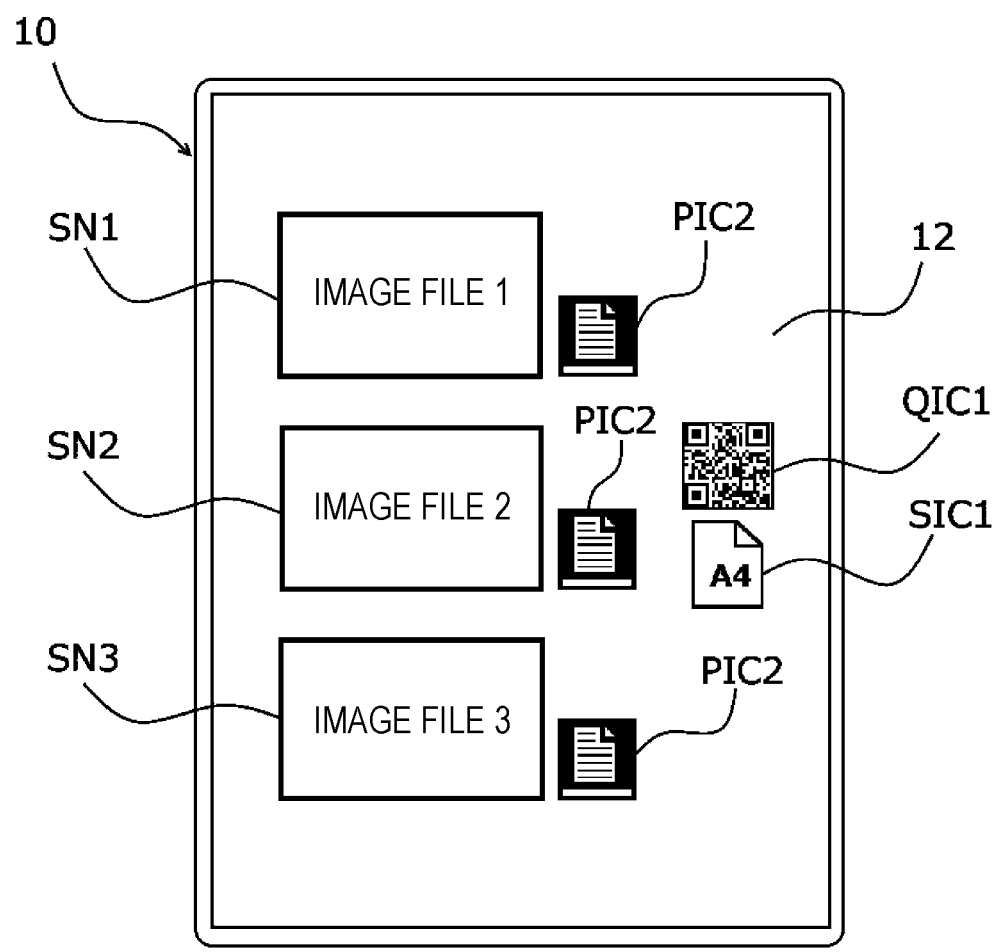
FIG. 17 illustrates thumbnails, printer icons, a code image, and a sheet size icon displayed on the terminal apparatus of a sixth modification.
Figure 18:
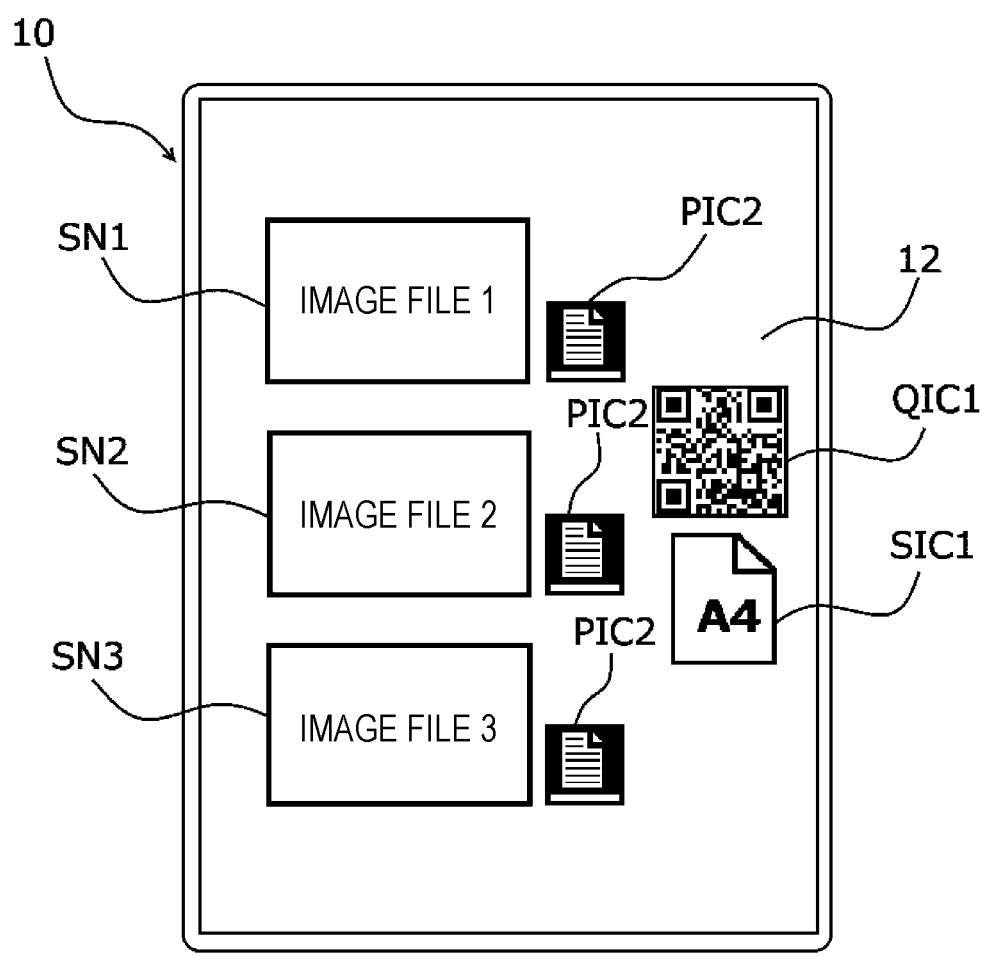
FIG. 18 illustrates another display form including thumbnails, printer icons, a code image, and a sheet size icon displayed on the terminal apparatus of a seventh modification.

FIG. 17 illustrates thumbnails, printer icons, a code image, and a sheet size icon displayed on the terminal apparatus 10 of a sixth modification, FIG. 18 illustrates thumbnails, printer icons, a code image, and a sheet size icon displayed on the terminal apparatus 10 of a seventh modification. The program transitions from the printer icon PIC 1 to the printer icon PIC 2 in the active state in the sixth modification. Referring to FIG. 17, the program displays the QR code (registered trademark) icon QIC 1 and the sheet size icon SIC 1 at a predetermined location close to a display region of the center printer icon PIC 2 at a central location of the printer icons PIC 2 on which the touching operation of the user is detected. Referring to FIG. 18, the QR code (registered trademark) icon QIC 1 and the sheet size icon SIC 1 are displayed in a larger size within the area of the display region of the display screen. In this way, a next operation step to acquire and output the content is clearly displayed to the user in connection with the content.

Figure 19:
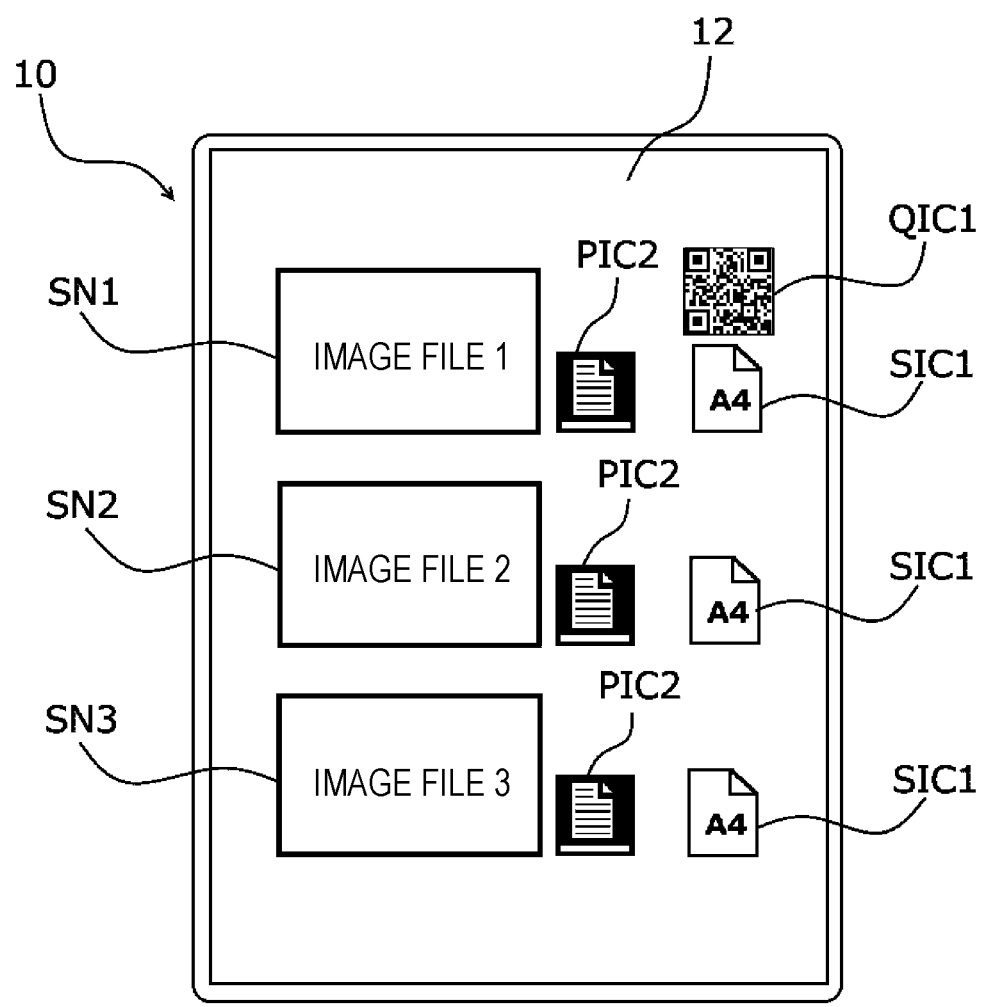
FIG. 19 illustrates a display form including printer icons and sheet size icons displayed on the terminal apparatus.

FIG. 19 illustrates a display form of printer icons and sheet size icons displayed on the terminal apparatus 10. Referring to FIG. 19, the program displays the sheet size icons SIC 1 respectively in pair with the printer icons PIC 2 at a predetermined location close to the display region of multiple printer icons PIC 2 that have detected the touching operation of the user. In this way, a next operation step to output the content is clearly displayed to the user.

Figure 20:
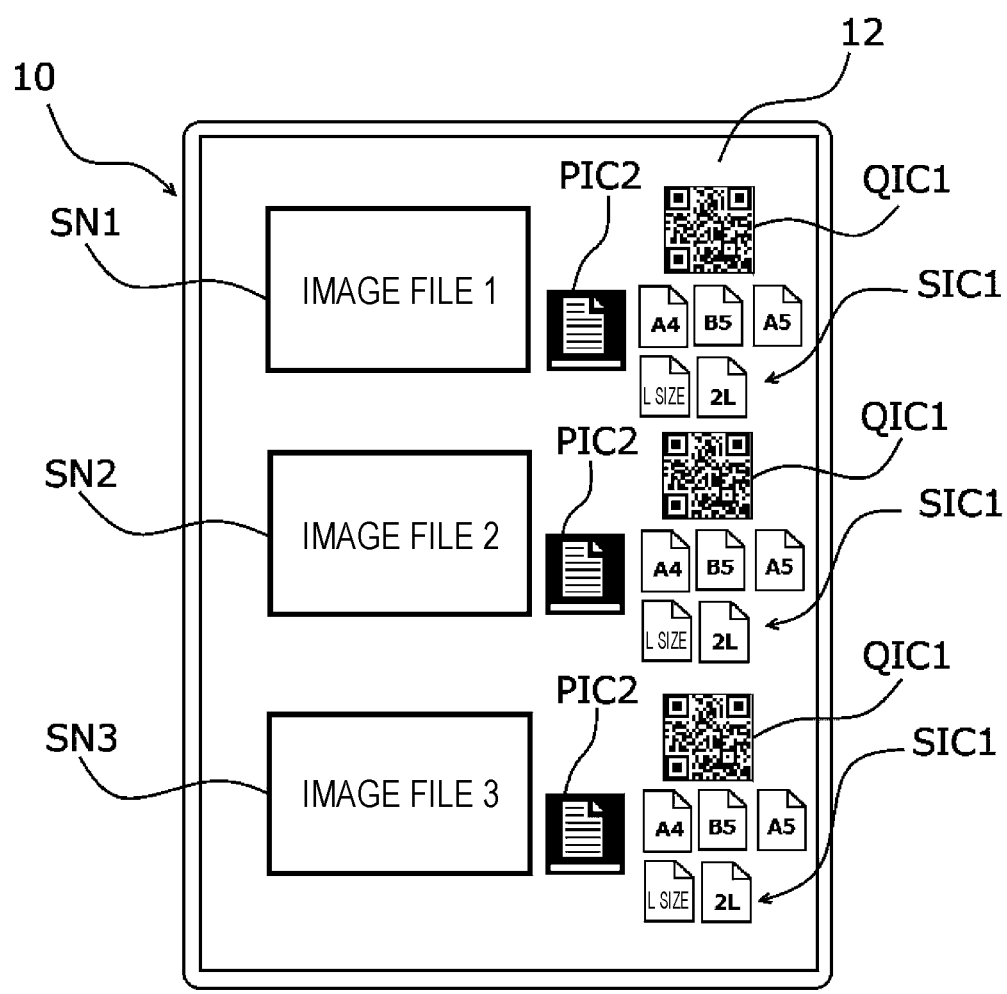
FIG. 20 illustrates a display form including printer icons and sheet size icons displayed on the terminal apparatus of an eighth modification.

FIG. 20 illustrates a display form of printer icons and sheet size icons displayed on the terminal apparatus 10 of an eighth modification. Referring to FIG. 20, the program displays multiple sheet size candidate icons SIC 1 for each printer icon PIC 2 at a predetermined location close to the display region of multiple printer icons PIC 2 that have detected the touching operation of the user. In this way, a next operation step to output the content is clearly displayed to the user.

Figure 21:
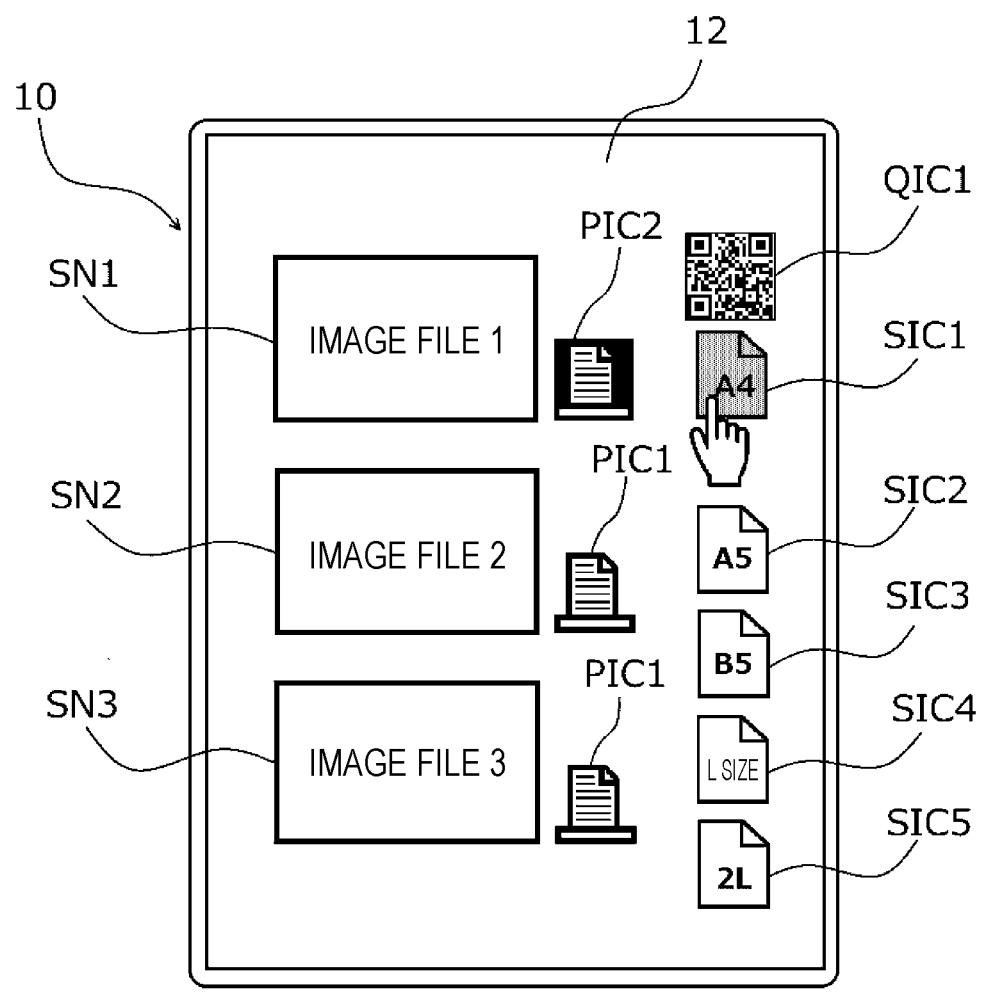
FIG. 21 illustrates a display form including printer icons and sheet size icons displayed on the terminal apparatus of a ninth modification.

FIG. 21 illustrates a display form of printer icons and sheet size icons displayed on the terminal apparatus 10 of a ninth modification. Referring to FIG. 21, if the program detects the touching operation of the user who has performed a long-time pressing on the sheet size icon SIC 1, the program displays multiple sheet size candidates of sheet size icons SIC 2, SIC 3, SIC 4, and SIC 5 in place of the sheet size icon SIC 1. In this way, the output size candidates to output the content are displayed.

Figure 22:
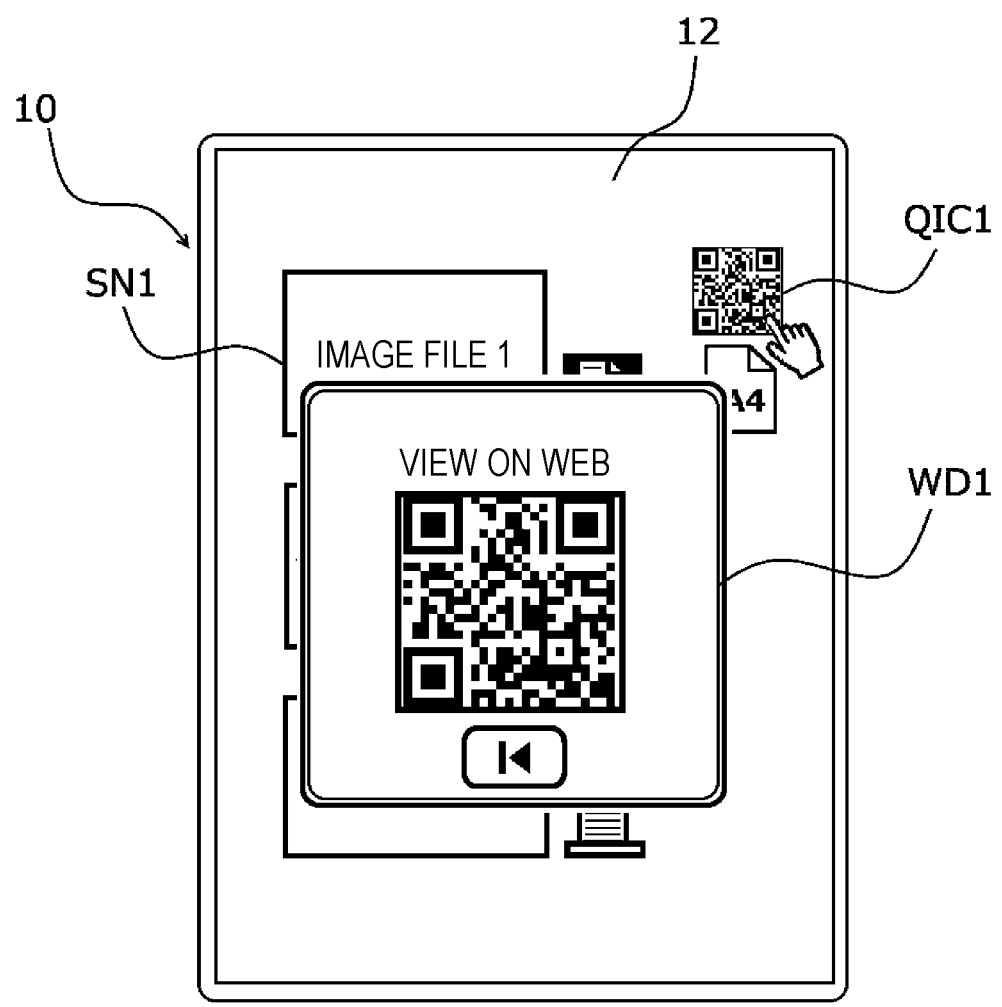
FIG. 22 illustrates a display form including a code pattern displayed on the terminal apparatus.

FIG. 22 displays a display form of a code pattern displayed on the terminal apparatus 10. Referring to FIG. 22, the program detects one touch on the QR code (registered trademark) icon QIC 1 (S105), and displays the QR code (registered trademark) as an example of the code pattern coded and linked with the URL, through which the server 30 storing the image files is accessed (S106). The server 30 is accessed via another window WD 1 on the front-most layer of the display screen of the terminal apparatus 10. In this way, the user may easily recognize the two-dimensional pattern and easily access specified content.

Figure 23:
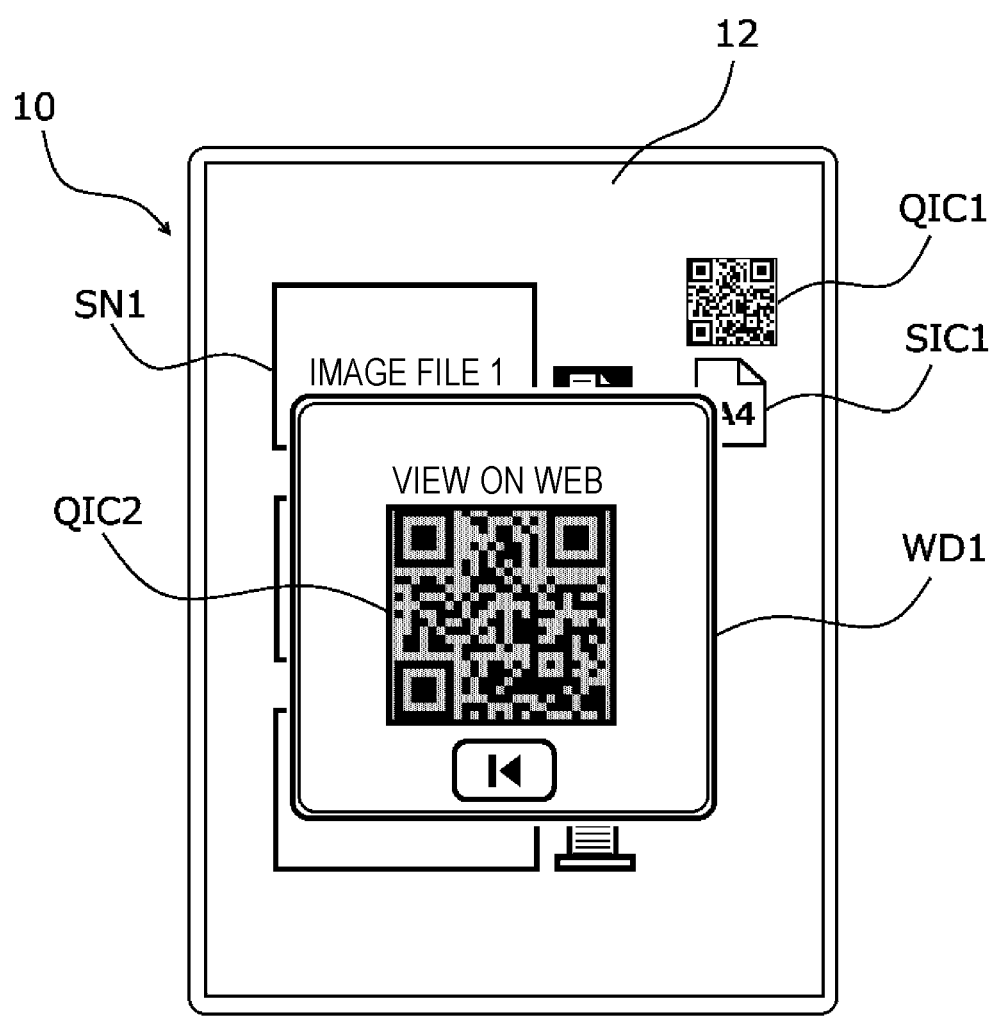
FIG. 23 illustrates a display form including an inactive code pattern displayed on the terminal apparatus.

FIG. 23 illustrates a display form of an inactive code pattern displayed on the terminal apparatus 10. Referring to FIG. 23, if the reading of the QR code (registered trademark) by an external device is detected, the program transitions the display of the QR code (registered trademark) to a QR code (registered trademark) icon QIC 2 that does not accept the user's operation to read. If a predetermined period of time has elapsed since the displaying of the QR code (registered trademark), the program transitions the display of the QR code (registered trademark) to the QR code (registered trademark) icon QIC 2 that does not accept the user's operation to read. Referring to FIG. 23, the window WD1 to display the QR code (registered trademark) may be hidden without transitioning the display of the QR code (registered trademark) to a state that does not accept the user's reading operation. In this way, the reading of the two-dimensional pattern is disabled.

Figure 24:
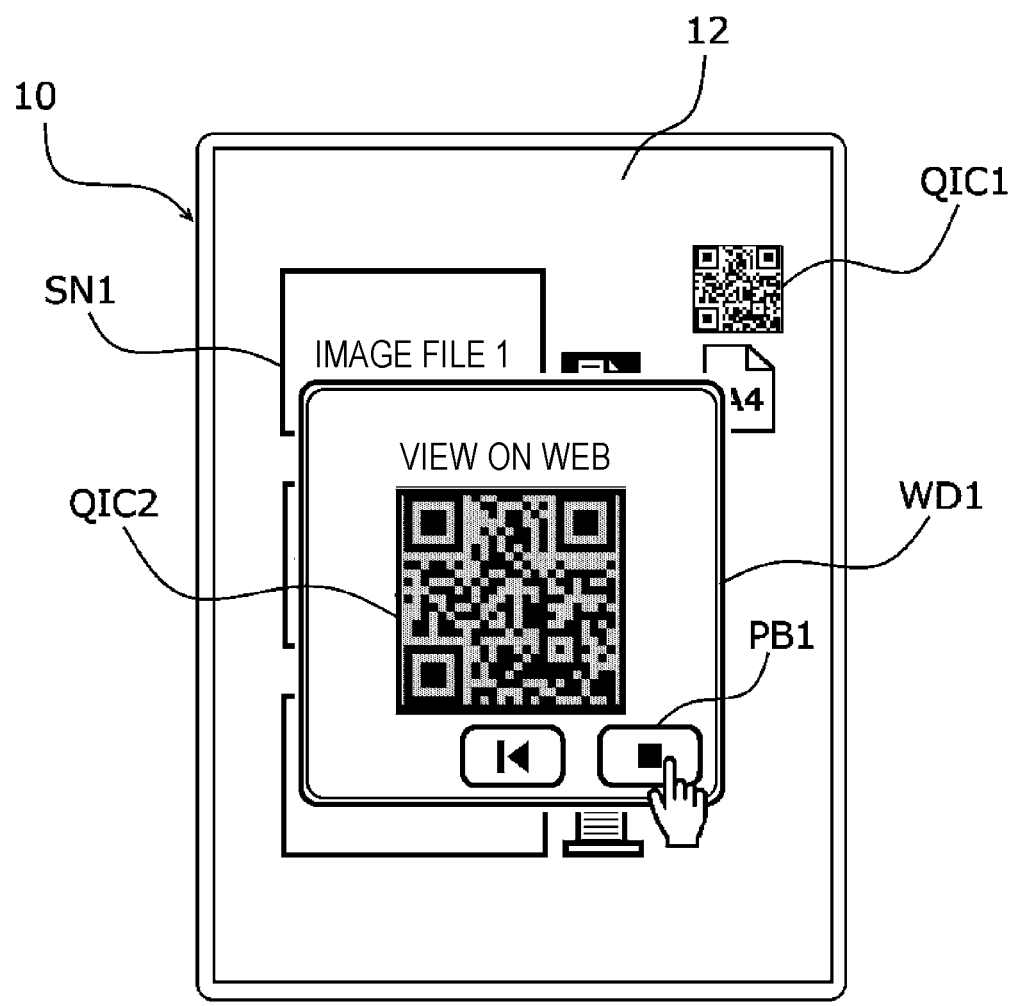
FIG. 24 illustrates a display form including a stop button displayed on the terminal apparatus.

FIG. 24 illustrates a display form of a stop button displayed on the terminal apparatus 10. Referring to FIG. 24, the program displays a stop button PB 1 as an operation receiving image in the display region of the QR code (registered trademark) (S106). The stop button PB 1 as the operation receiving image is to transition the display of the QR code (registered trademark) in response to a detected touching operation by the user to a QR code (registered trademark) QIC 2 in a state that does not accept the user's operation to read. If a touching operation on the stop button PB 1 is detected (S107), the program transitions the display of the QR code (registered trademark) into a state that does not accept the user's operation to read, or hides the window WD 1 that displays the QR code (registered trademark). In this way, the reading of the code image is disabled.

Figure 25:
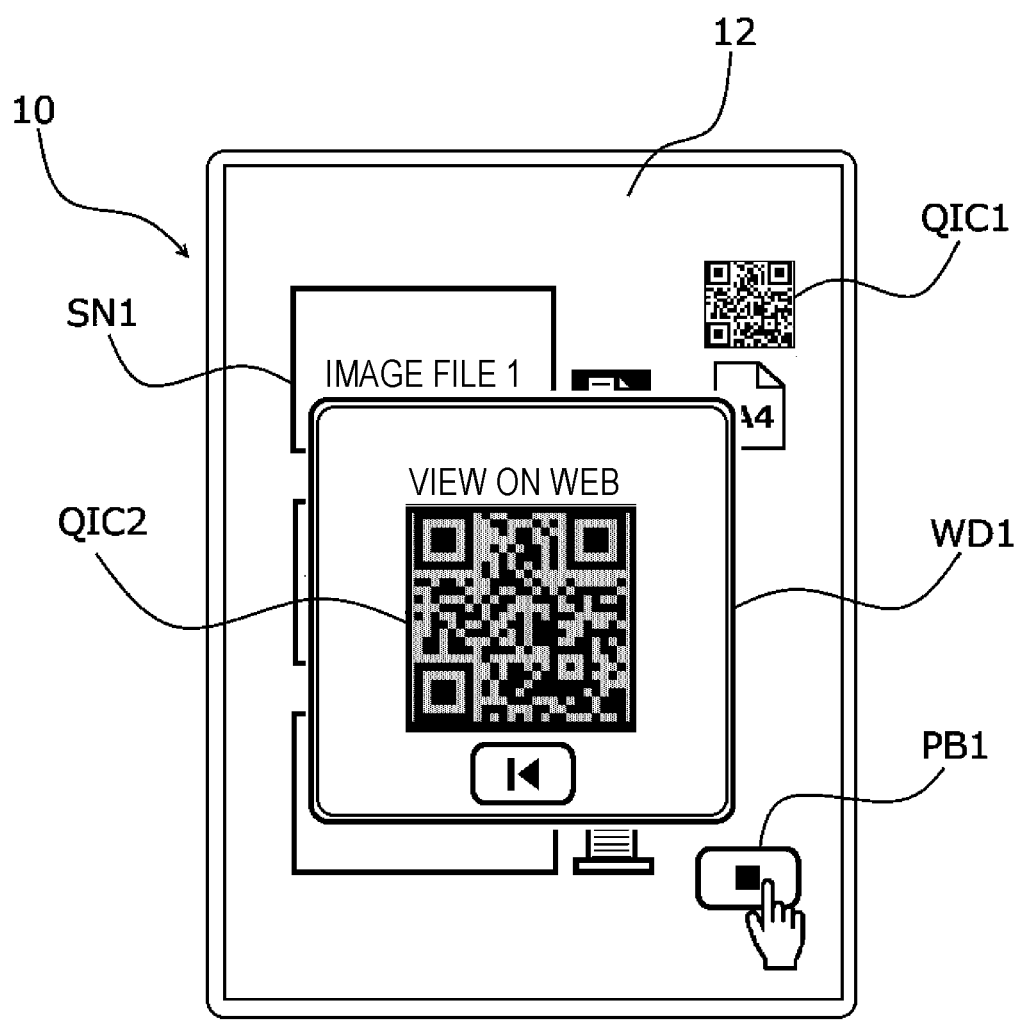
FIG. 25 illustrates a display form including a stop button displayed on the terminal apparatus of a tenth modification.

FIG. 25 illustrates a display form of the stop button PB 1 displayed on the terminal apparatus 10 of a tenth modification. Referring to FIG. 25, the program displays a stop button PB 1 as an operation receiving image at a predetermined location of the display region of the display screen of the terminal apparatus 10 where a window displaying the QR code (registered trademark) is not displayed (S106). The stop button PB 1 as the operation receiving image is to transition the display of the QR code (registered trademark) in response to a detected touching operation by the user to a QR code (registered trademark) QIC 2 in a state that does not accept the user's operation to read. If a touching operation on the stop button PB 1 is detected (S107), the program transitions the display of the QR code (registered trademark) into a state that does not accept the user's operation to read, or hides the window WD 1 that displays the QR code (registered trademark). In this way, the reading of the code image is disabled.

Figure 26:
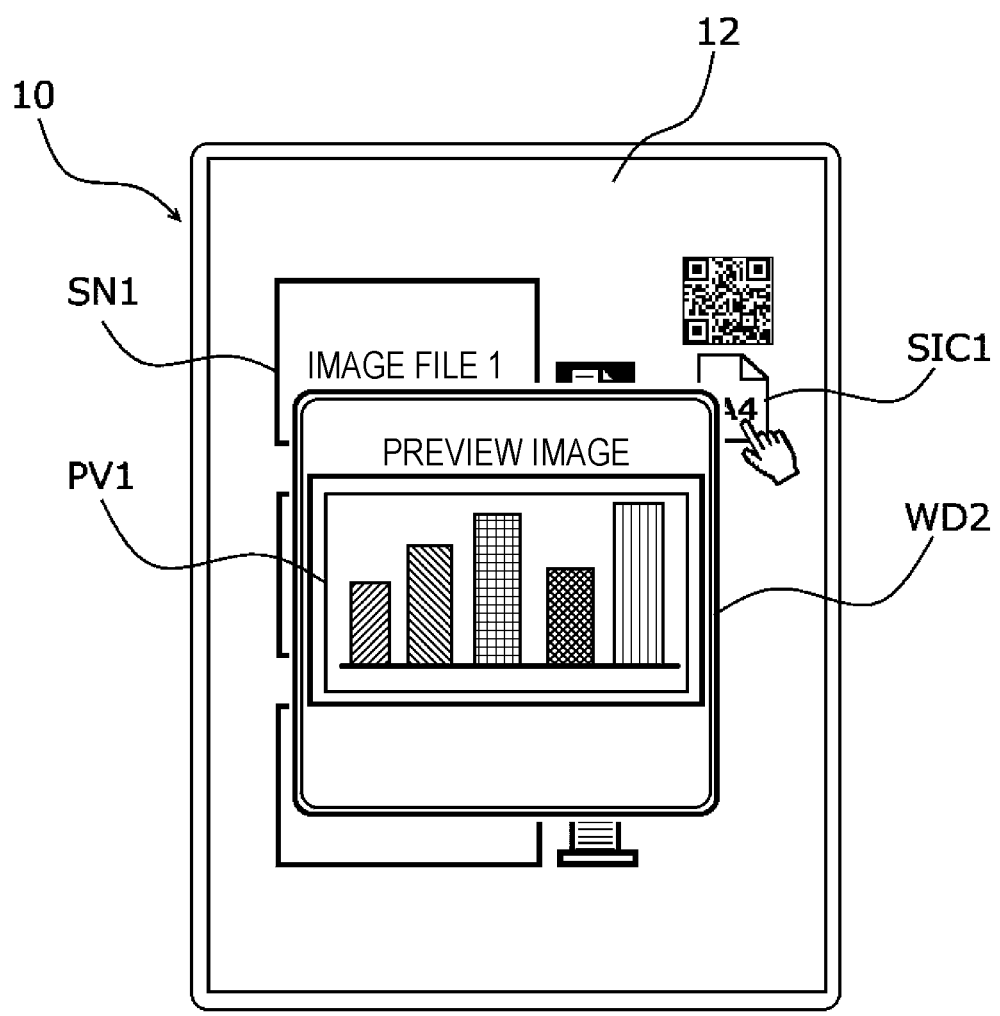
FIG. 26 illustrates a display form including a preview image of content displayed on the terminal apparatus.

FIG. 26 illustrates a display form of a preview image of content displayed on the terminal apparatus 10. The program detects one touch on the sheet size icon SIC 1 as illustrated in FIG. 26 (S108), and displays, in another window on a front-most layer of the display screen of the terminal apparatus 10, a preview screen WD 2 having a preview image PV 1 to output the content (S109). In this way, the preview screen WD 2 to print the content may be displayed using minimum operation steps.

Figure 27:
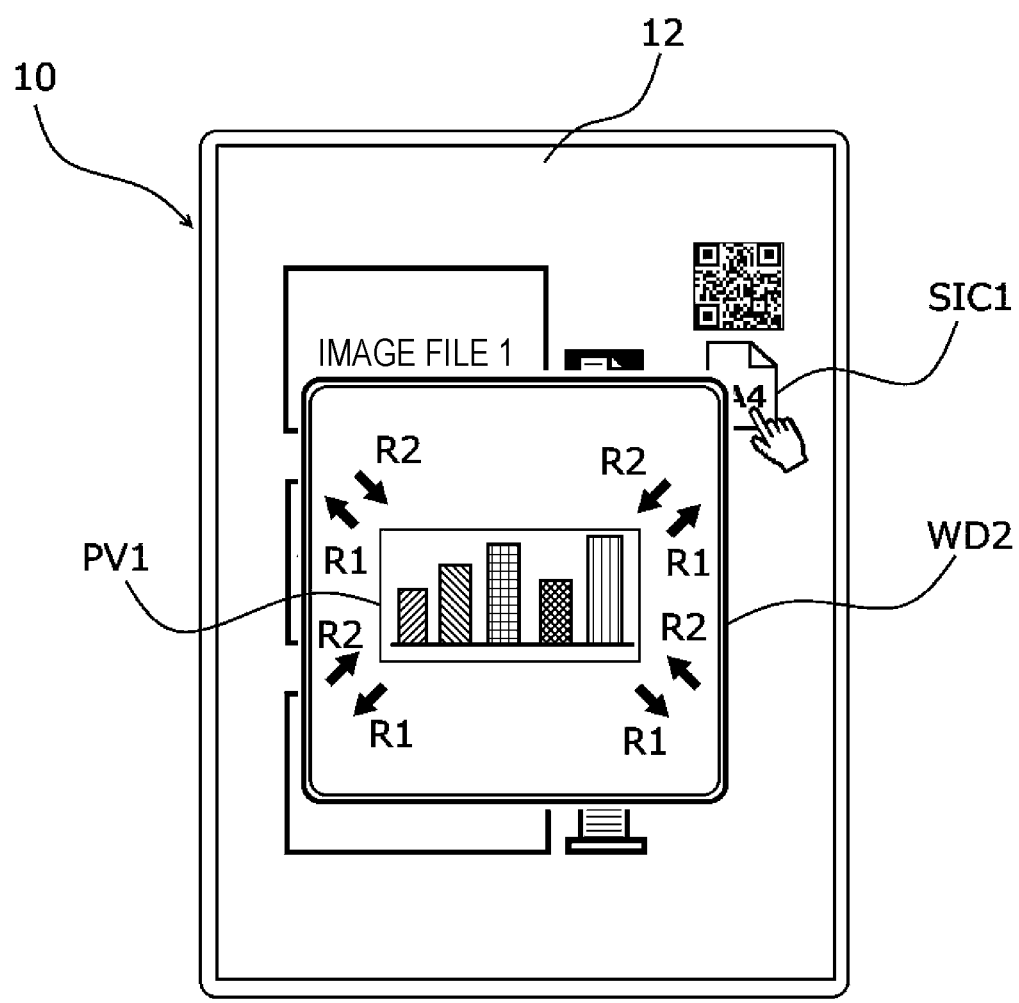
FIG. 27 illustrates an example of the display form of the preview image of the content displayed on the terminal apparatus.
Figure 28:
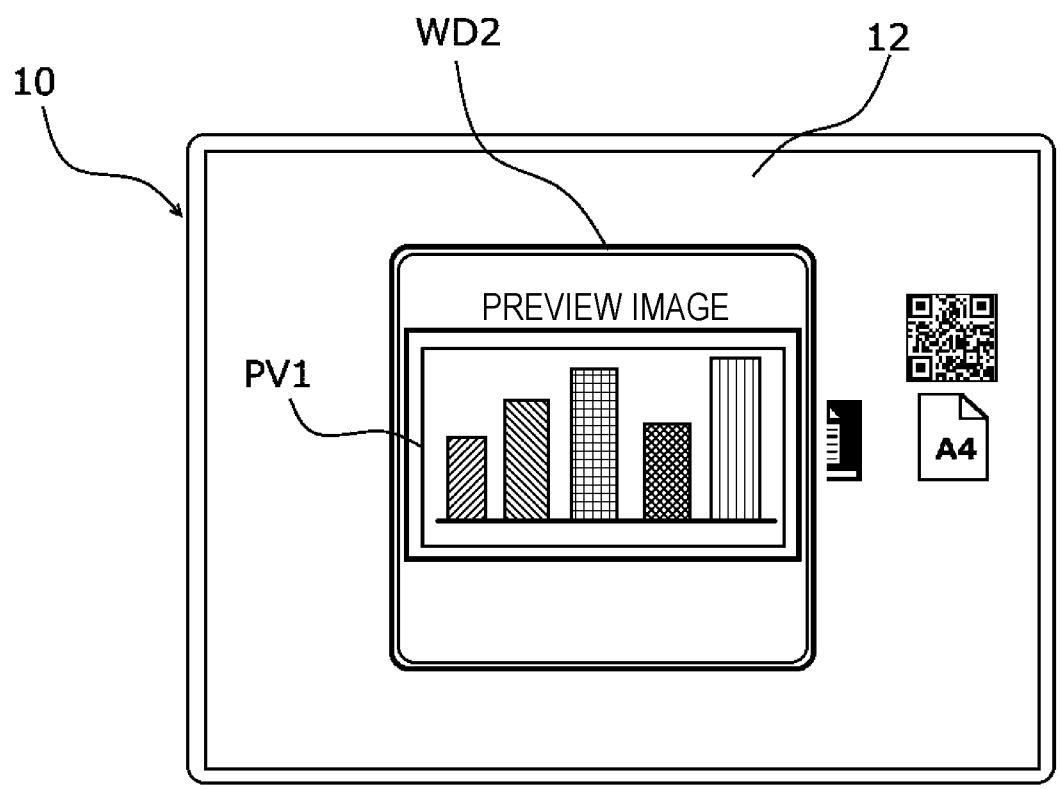
FIG. 28 illustrates another example of the display form of the preview image of the content displayed on the terminal apparatus.

FIG. 27 illustrates an example of the display form of the preview image of the content displayed on the terminal apparatus 10. FIG. 28 illustrates the display form of the preview image of the content displayed on the terminal apparatus 10. Referring to FIG. 27, the program displays the preview image PV 1 of the displayed content in a larger or smaller size in response to the user's pinchout operation (see arrow marks R1) or pinchin operation (see arrow marks R2). Referring to FIG. 28, the program displays the preview image PV 1 of the displayed content in rotation. In this way, the display form of the preview image PV 1 may be changed.

Figure 29:
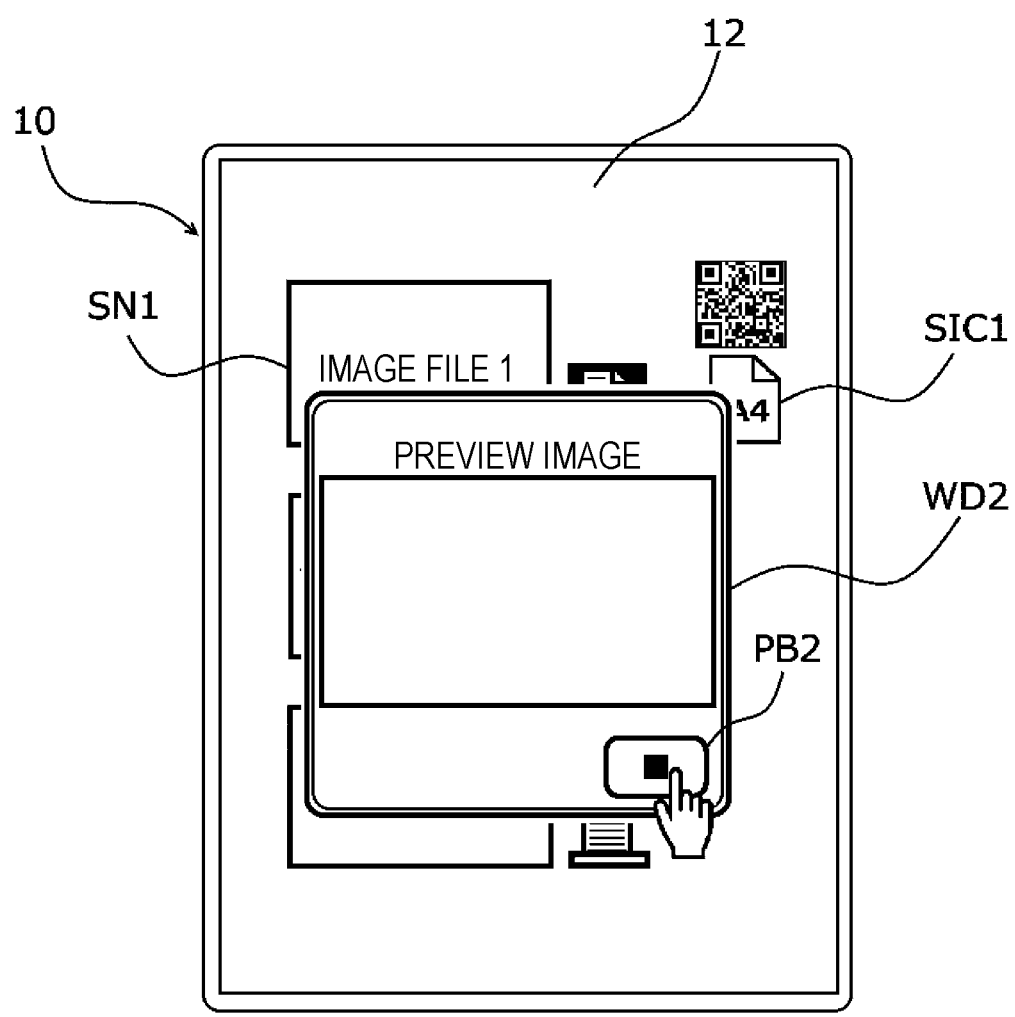
FIG. 29 illustrates a display form of the stop button displayed on the terminal apparatus.

FIG. 29 illustrates a display form of a stop button PB 2 displayed on the terminal apparatus 10. The program displays the stop button PB 2 serving as an operation receiving image in the display region of the preview image PV 1 as illustrated in FIG. 29 (S109). The stop button PB 2 serving as the operation receiving image hides the preview image PV 1 in response to the detected touching operation of the user. If a touching operation on the stop button PB 2 is detected (S107), the program transitions the screen to a thumbnail image display of the content. In this way, the preview screen WD 2 once displayed is thus hidden.

Figure 30:
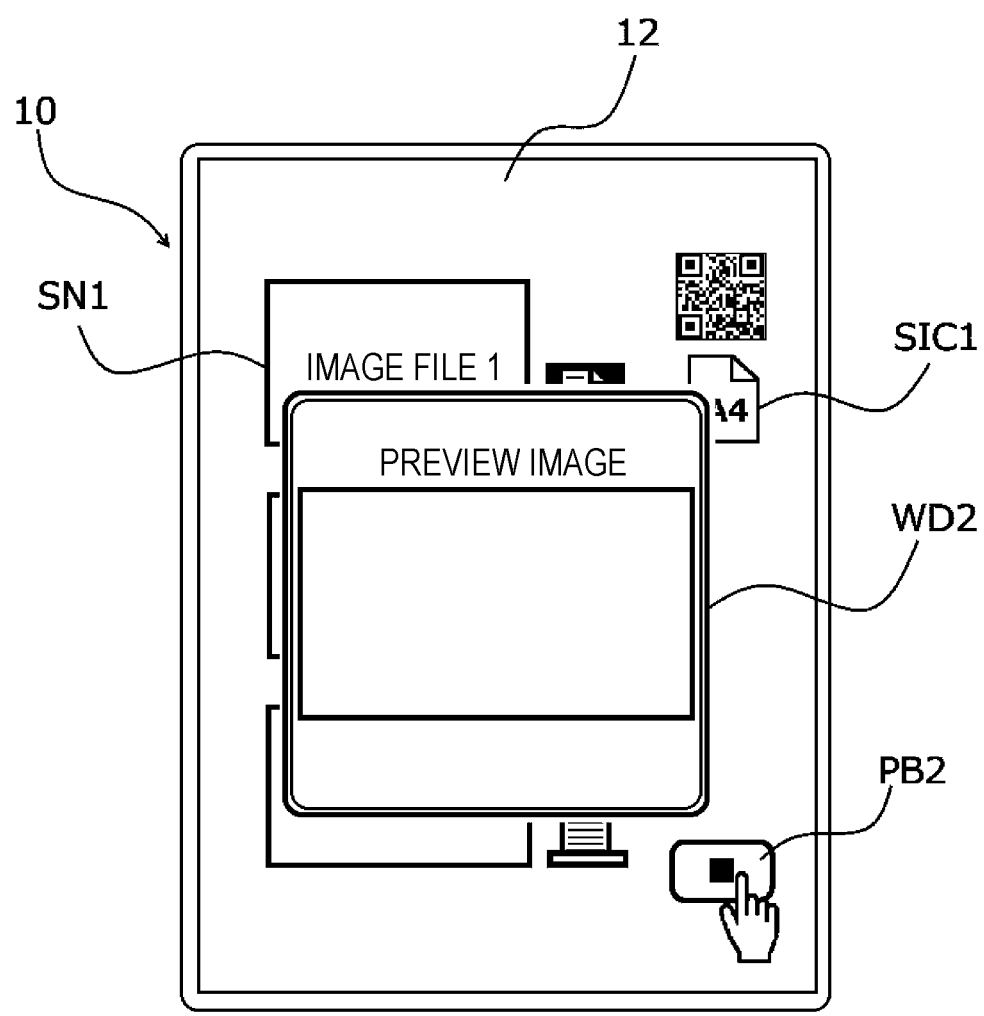
FIG. 30 illustrates a display form of the stop button displayed on the terminal apparatus of an eleventh modification.

FIG. 30 illustrates the display form of the stop button PB 2 displayed on the terminal apparatus 10 of an eleventh modification. Referring to FIG. 30, the program displays the stop button PB 2 as an operation receiving image at a predetermined location of the display region on the display screen of the terminal apparatus 10 where the preview screen WD 2 displaying the preview image PV 1 is not displayed (S109). The stop button PB 2 as the operation receiving image hides the preview image PV 1 in response to the detected touching operation of the user. Upon detecting the touching operation on the stop button PB 2 (S107), the program transitions the screen to the thumbnail image display of the content. In this way, the preview screen WD 2 once displayed is hidden using minimum operation steps.

Figure 31:
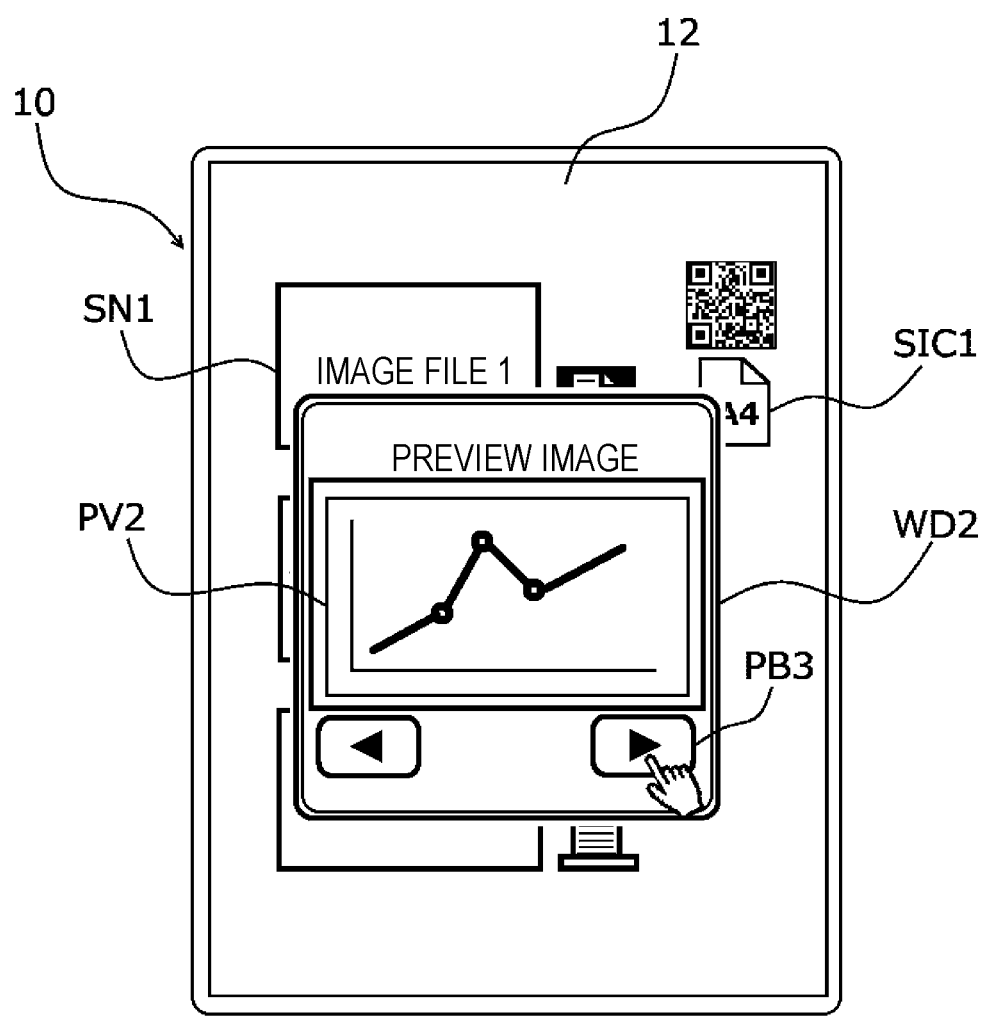
FIG. 31 illustrates a display form of a turn button displayed on the terminal apparatus.

FIG. 31 illustrates the display form of a turn button PB 3 displayed on the terminal apparatus 10. The program displays the turn button PB 3 serving as an operation receiving image that switches from the preview image PV 1 currently displayed to another piece of content. If the touching operation of the user on the turn button PB 3 is detected, the program displays a preview image PV 2 as content different from the content currently displayed. In this way, the preview image of the other content is displayed using minimum operation steps.

Figure 32:
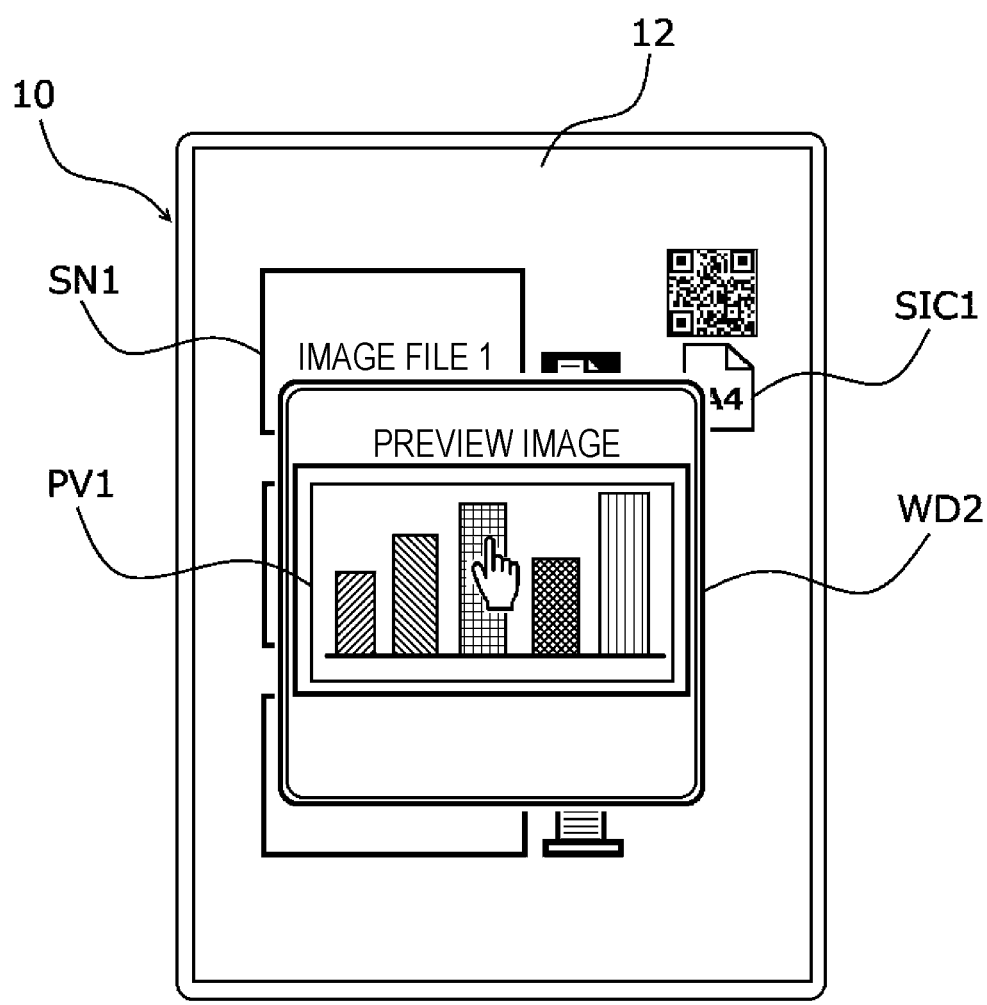
FIG. 32 illustrates a display form of a preview image displayed on the terminal apparatus of a twelfth modification.

FIG. 32 illustrates the display form of a preview image displayed on the terminal apparatus 10 of a twelfth modification. Upon detecting the touching operation of the user on the preview image PV 1 currently displayed as illustrated in FIG. 32, the program displays the preview image PV 2 (see FIG. 31) as the other content different from the content currently displayed. In this way, the preview image of the other content is displayed using minimum operation steps.

Figure 33:
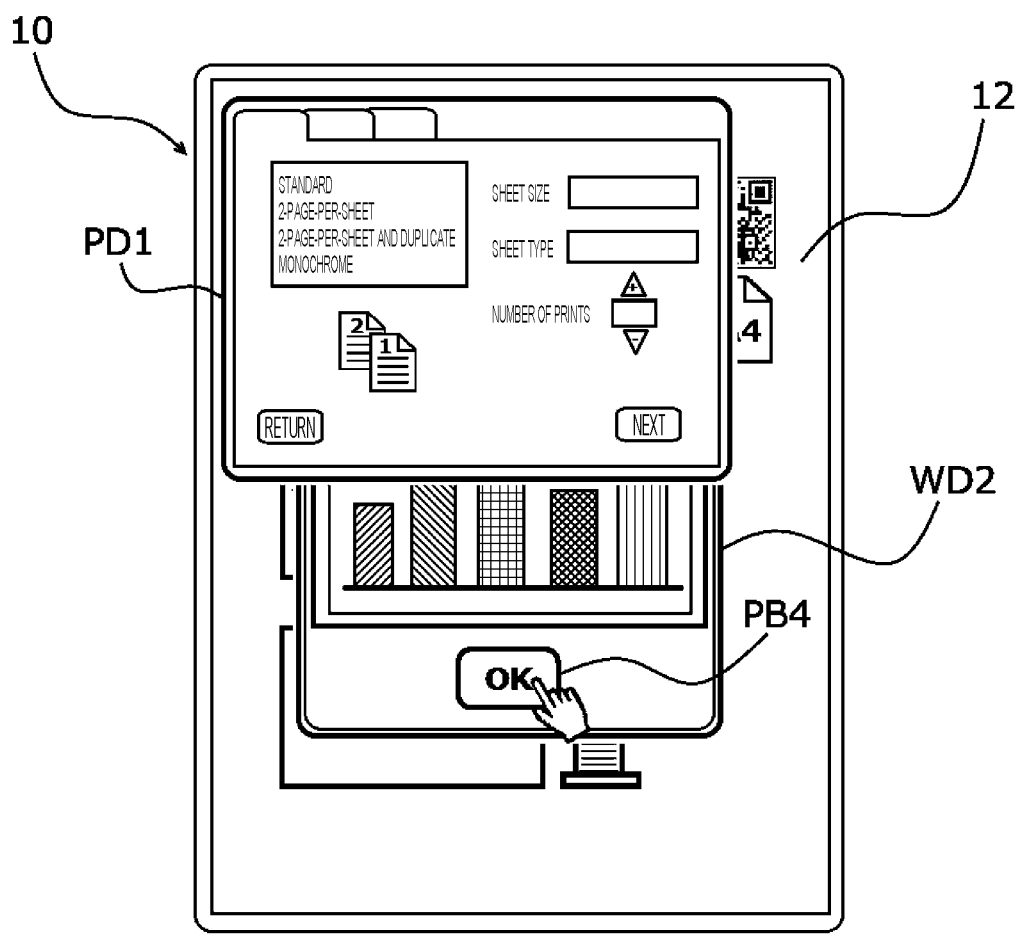
FIG. 33 illustrates a display form of an output setting screen displayed on the terminal apparatus.

FIG. 33 illustrates the display form of an output setting screen displayed on the terminal apparatus 10. Referring to FIG. 33, the program displays an OK button PB 4 serving as an operation receiving image that fixes a setting currently displayed, and advances the operation. Upon detecting the touching operation of the user on the OK button PB 4, the program displays an output (print) setting screen PD 1 that sets an output (print) setting parameter of the content under preview. In this way, the output (print) setting screen to set the output (print) setting parameter is displayed using minimum operation steps.

Figure 34:
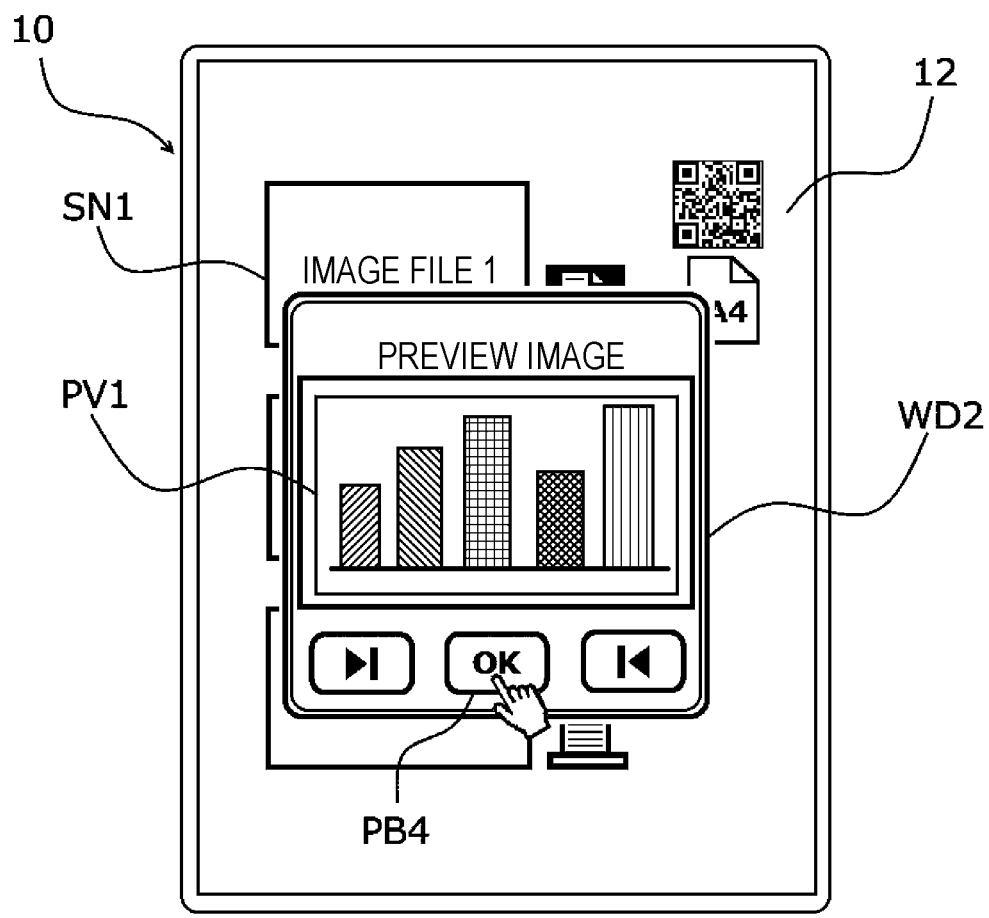
FIG. 34 illustrates a display form of an OK button that advances the operation to display on the terminal apparatus.

FIG. 34 illustrates the display form of the OK button PB 4 to advance the operation displayed on the terminal apparatus 10. Referring to FIG. 34, the program displays the OK button PB 4 serving as an operation receiving image that fixes the setting currently displayed and advances the operation. Upon detecting the touching operation of the user on the OK button PB 4 (S110), the program transmits a print job of the content under preview to the image forming apparatus 20 connected to the terminal apparatus 10 (S111), and displays a message reading "Print job done" (S112). In this way, the outputting (printing) of the content is performed using minimum operation steps.

Figure 35:
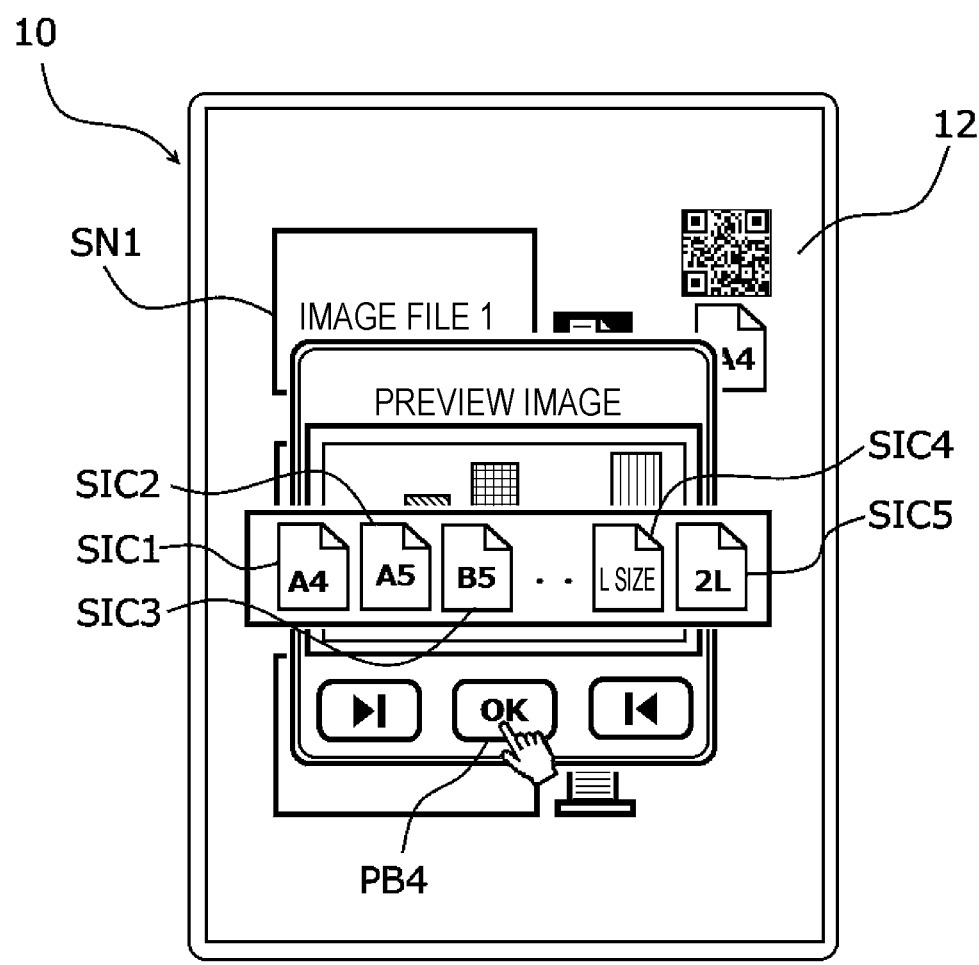
FIG. 35 illustrates a display form of a sheet size icon displayed on the terminal apparatus.

FIG. 35 illustrates the display form of sheet size icons displayed on the terminal apparatus 10. Referring to FIG. 35, the program displays the OK button PB 4 serving as an operation receiving image that fixes the setting currently displayed and advances the operation. Upon receiving the touching operation of the user on the OK button PB 4 (S110), the program displays a list of sheet sizes SIC 1, SIC 2, SIC 3, SIC 4, and SIC 5 that are selectable via the touching operation of the user. When the program detects the touching operation of the user on a sheet size icon, the program transmits the print job of the content under preview to the image forming apparatus 20 connected to the terminal apparatus 10 (S111), and displays the message reading "Print job done" on the display screen of the terminal apparatus 10 (S112). The content is thus output (printed) using minimum operation steps.

When the touching operation of the user on anywhere on the display screen of the terminal apparatus 10 (S113), the program hides the preview screen WD 2 that is to display the preview image PV 1 of the content, and displays the thumbnails and the printer icons of the content on the display panel 12.

The output instruction of the content is easily performed using the user interface. The present invention has been described with reference to the particular exemplary embodiments illustrated in the drawings. The present invention is not limited to the embodiments described with reference to the drawings. As long as the same effect of the present invention is provided, configuration and exemplary embodiments in the related art may be employed. For example, the terminal apparatus 10 includes the touch panel 13 to detect the touching operation of the user. Alternatively, the terminal apparatus 10 may perform the process thereof in response to a selection operation via a mouse or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 processor programmed to:
 cause display of both (i) an image to be output and (ii) an image linked with each piece of outputtable content; and
 in response to receiving an operating instructions of a user, change a display form of the image to be output, wherein
 if the operating instruction of the user has been received at the image to be output, a code image and an output size image are displayed at a predetermined location close to a display region of the image to be output.

2. The information processing apparatus according to claim 1, wherein the image to be output is displayed at a predetermined location close to a display region of the content.

3. The information processing apparatus according to claim 1, wherein the image to be output is displayed in a display region that does not overlap another object image.

4. The information processing apparatus according to claim 1, wherein the image to be output is displayed to overlap with the content.

5. The information processing apparatus according to claim 1, wherein an output target is alternately designated or undesignated each time the image to be output is operated.

6. The information processing apparatus according to claim 1, wherein the image to be output transitions into a state that does not accept the operating instruction of the user if the operating instruction of the user has been received at a predetermined region close to the display region of the image to be output with the display form thereof changed.

7. The information processing apparatus according to claim 1, wherein the image to be output transitions into a state that does not accept the operating instruction of the user if the operating instruction of the user has been received at a display region that does not display the content and the image to be output.

8. The information processing apparatus according to claim 1, wherein an operation receiving image that causes the image to be output to transition into a state that does not accept the operating instruction of the user is displayed if the operating instruction of the user has been received.

9. The information processing apparatus according to claim 1, wherein the code image and the output size image are displayed at the predetermined location close to the display region of the image to be output having received the latest operating instruction of the user.

10. The information processing apparatus according to claim 1, wherein the code image and the output size image are displayed at the predetermined location close to the display region of the image to be output located at a center of a plurality of images to be output that have received the operating instruction of the user.

11. The information processing apparatus according to claim 1, wherein the code image and the output size image are displayed in a larger size in an area of a display enabled region at the predetermined location close to the display region of the image to be output located at a center of a plurality of images to be output that have received the operating instruction of the user.

12. The information processing apparatus according to claim 1, wherein the output size image is displayed in pair with the image to be output at the predetermined location close to the display region of a plurality of images to be output that have received the operating instruction of the user.

13. The information processing apparatus according to claim 1, wherein the output size image is displayed on a per output size basis of a plurality of output size candidates.

14. The information processing apparatus according to claim 1, wherein a plurality of output size image candidates are displayed in place of the output size image if the operating instruction of the user has been received with the output size image pressed for more than a predetermined time.

15. The information processing apparatus according to claim 1, wherein a code pattern that is coded and is linked with access information used to access the acquired content is displayed if an operation instruction of the user has been received at the code image.

16. The information processing apparatus according to claim 15, wherein the code pattern is displayed on a frontmost layer of a display screen of the information processing apparatus.

17. The information processing apparatus according to claim 15, wherein a display of the code pattern transitions into a state that does not accept the operation instruction of the user if reading of the code pattern by an external device has been detected.

18. The information processing apparatus according to claim 15, wherein a display of the code pattern transitions into a state that does not accept the operation instruction of the user if a predetermined period of time has elapsed since the displaying of the code pattern.

19. The information processing apparatus according to claim 15, wherein an operation receiving image that transitions, in response to the received operation instruction of the user, the display of the code pattern into a state that does not accept the operation instruction of the user is displayed in a display region of the code pattern.

20. The information processing apparatus according to claim 15, wherein an operation receiving image that transitions, in response to the received operation instruction of the user, the display of the code pattern into a state that does not accept the operation instruction of the user is displayed at a predetermined location in a display region of a display screen of the information processing apparatus where the code pattern is not displayed.

21. The information processing apparatus according to claim 1, wherein a preview screen with a preview image displayed thereon to output the content is displayed if the operating instruction of the user has been received at the output size image.

22. The information processing apparatus according to claim 21, wherein the preview image is displayed in a larger or smaller size in response to an operating instruction of the user at the preview image.

23. The information processing apparatus according to claim 21, wherein the preview screen is displayed in a rotatable fashion in response to a rotation movement of the information processing apparatus.

24. The information processing apparatus according to claim 21, wherein the preview screen is hidden if a predetermined period of time has elapsed since the displaying of the preview screen.

25. The information processing apparatus according to claim 21, wherein an operation receiving image that hides the preview screen, in response to a received operating instruction of the user thereon, is displayed in a display region of the preview screen.

26. The information processing apparatus according to claim 21, wherein an operation receiving image that hides the preview screen, in response to a received operating instruction of the user thereon, is displayed at a predetermined location of a display region on a display screen of the information processing apparatus where the preview image is not displayed.

27. The information processing apparatus according to claim 21, wherein the preview screen further displays an operation receiving image to switch from a currently displayed preview image to another piece of the content and displays the preview image of the other piece of the content in response to an operating instruction of the user at the operation receiving image.

28. The information processing apparatus according to claim 21, wherein the preview screen displays a preview image of another piece of the content in response to an operating instruction of the user at a currently displayed preview image.

29. The information processing apparatus according to claim 21, wherein the preview screen further includes an operation receiving image that fixes a currently displayed setting and advances an operation, and displays an output setting screen to set an output setting parameter of the content if an operating instruction of the user is received at the operation receiving image.

30. The information processing apparatus according to claim 21, wherein the preview screen further displays an operation receiving image that fixes a currently displayed setting and advances an operation, and transmits a print job to a printer connected to the information processing apparatus if an operating instruction of the user is received at the operation receiving image.

31. The information processing apparatus according to claim 21, wherein:
   the preview screen further displays an operation receiving image that fixes a currently displayed setting and advances an operation, and displays a list of selectable output sizes in response to an operating instruction of the user at the operation receiving image; and
   a print job is transmitted to a printer connected to the information processing apparatus if one of the selectable output sizes is selected.

32. A non-transitory computer readable medium storing a program causing a computer to execute a process for processing information, the process comprising:
   causing display of both (i) an image to be output and (ii) an image linked with each piece of outputtable content; and
   in response to receiving an operating instructions of a user, changing a display form of the image to be output, wherein
   if the operating instruction of the user has been received at the image to be output, a code image and an output size image are displayed at a predetermined location close to a display region of the image to be output.

* * * * *